US012747744B2

(12) United States Patent
Murphy et al.

(10) Patent No.: US 12,747,744 B2
(45) Date of Patent: Sep. 29, 2026

(54) DISTRIBUTION NETWORK EVENT CORRELATION AND LOCALIZATION

(71) Applicant: Itron, Inc., Liberty Lake, WA (US)

(72) Inventors: Bryce Murphy, Austin, TX (US); Gokulmuthu Narayanaswamy, Bangalore (IN); Anantha Ram Tata, Bangalore (IN); Iranagouda Kotyal, Karnataka (IN)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 19/007,272

(22) Filed: Dec. 31, 2024

(65) Prior Publication Data

US 2026/0099508 A1 Apr. 9, 2026

Related U.S. Application Data

(60) Provisional application No. 63/703,770, filed on Oct. 4, 2024.

(51) Int. Cl.

| | |
|---|---|
| ***G06F 16/00*** | (2019.01) |
| ***F15B 19/00*** | (2006.01) |
| ***G01L 19/00*** | (2006.01) |
| ***G01L 23/08*** | (2006.01) |
| ***G01L 23/32*** | (2006.01) |

(Continued)

(52) U.S. Cl.

CPC ........ *F15B 19/005* (2013.01); *G01L 19/0092* (2013.01); *G01L 23/08* (2013.01); *G01L 23/32* (2013.01); *G06F 16/258* (2019.01); *G06F 16/282* (2019.01); *G06F 16/29* (2019.01)

(58) Field of Classification Search

CPC ....... G06F 16/258; G06F 16/282; G06F 16/29

See application file for complete search history.

(56) References Cited

U.S. PATENT DOCUMENTS

2014/0052421 A1* 2/2014 Allen ...................... G06F 30/20 703/2

2018/0330242 A1* 11/2018 Dubois .................. G06Q 50/06

(Continued)

OTHER PUBLICATIONS

TakaDu offers an event management platform for water distribution networks that integrates data from external systems/applications for the purpose of water leak identification and localization; retrieved on Aug. 20, 2025 at https://www.takadu.com/; 7 pages.

(Continued)

*Primary Examiner* — Dinku W Gebresenbet

(74) *Attorney, Agent, or Firm* — Lee & Hayes, P.C.

(57) ABSTRACT

Techniques for distribution network event correlation and localization comprising receiving alarm data, event data, and hierarchical data. Identifying, based at least in part on the alarm data, the event data, and the hierarchical relationship data, a correlation between alarms or events detected by or delivered to the system, wherein the alarms or the events resulted in an event that propagated across the system, and the event generated alarms detected by a plurality of sensors in the system. Determining a location of the event based at least in part on the correlation, first and second time series data associated with first and second sensors, and the hierarchical relationship; then displaying descriptive information identifying the location of the event and one or more response tools for responding to the event.

23 Claims, 10 Drawing Sheets

(51) Int. Cl.

| | |
|---|---|
| ***G06F 16/25*** | (2019.01) |
| ***G06F 16/28*** | (2019.01) |
| ***G06F 16/29*** | (2019.01) |

(56) References Cited

U.S. PATENT DOCUMENTS

| | | | | |
|---|---|---|---|---|
| 2021/0389968 | A1* | 12/2021 | Majewski | G06F 9/54 |
| 2025/0044782 | A1* | 2/2025 | Boyle | G05B 23/0275 |
| 2026/0098551 | A1 | 4/2026 | Murphy | |
| 2026/0098774 | A1 | 4/2026 | Murphy | |

OTHER PUBLICATIONS

Xylem / Sensus offers a pressure monitoring application that visualizes pressure readings from Sensus water metering devices; retrieved Aug. 20, 2025 at https://www.xylem.com/en-us/products--services/software/pressure-profile/; 5 pages.

* cited by examiner

DISTRIBUTION NETWORK EVENT CORRELATION AND LOCALIZATION

This application claims the benefit of priority to U.S. Provisional Application No. 63/703,770, filed on Oct. 4, 2024, which is incorporated herein by reference in its entirety.

BACKGROUND

Utility companies provide gas, water, electricity, sewer, oil, and/or other consumables or services to consumers. A utility company may offer such services over a considerable geographic area and to a large number of consumers. Utility companies have increasingly networked their infrastructure, and considerable data is generated from measurement points throughout their systems. However, the data is fragmented across disparate, siloed systems and departments. For example, data from first types of utility systems (e.g., Utility SCADA (supervisory control and data acquisition systems), Utility GIS (geographic information systems), Utility Hydraulic Models, Utility Work Order Management, etc.) may be disparate and siloed from one another, from data from second types of utility systems (e.g., products and services for delivering, measuring consumption, and/or managing distribution of electricity, gas, and water to and/or generated from a plurality of service sites), and/or from data from third types of utility systems (e.g., third party Applications, third party Sensors, third party Networks, third party Meters, etc.), such as weather services providing data about current weather conditions and/or weather forecasts, satellite data, or the like. Likewise, data from the second type of utility systems can be siloed from each other and/or from the first and third types of utility systems, and data from the third type of utility systems can be siloed from each other and/or from the first and second types of utility systems.

Because the first types of utilities, the second types of utilities, and the third types of utilities are disparate and siloed, the resulting data, alarms, tools, and processes are fragmented across these disparate and siloed systems and departments. As a result, there is a lack of adequate visibility to how data and/or events occurring in one system may or may not relate to data and/or events in another system. Thus, if the data from one or more of these disparate and siloed systems and/or departments is not available to personnel, the chances of successfully identifying an underlying problem or otherwise achieving a goal may be lower and/or the time and energy required to achieve the goal may be longer.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
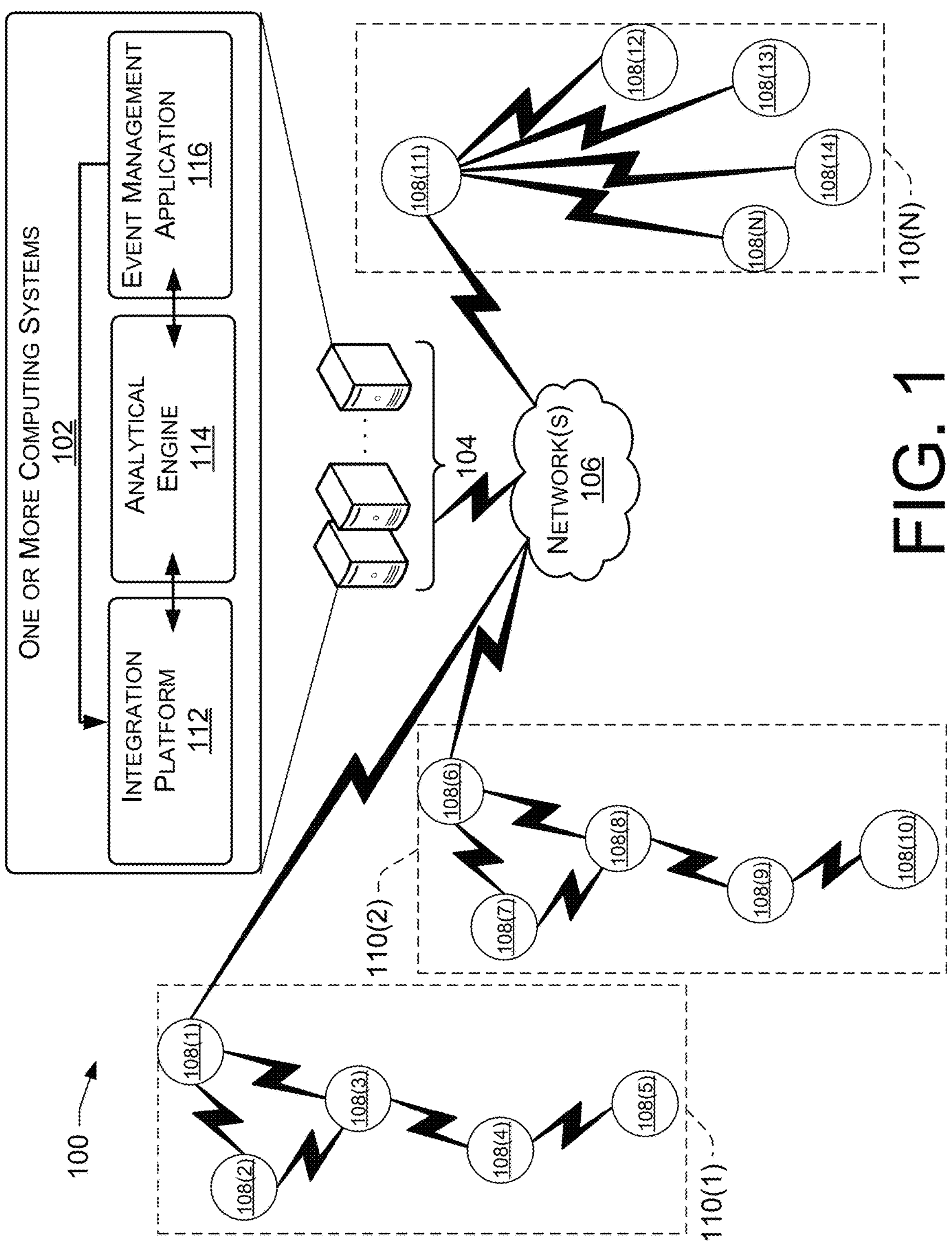
FIG. 1 illustrates a schematic diagram showing an example utility system from which utility data may be obtained, along with an example computing device, such as a central office server, for commodity and technology agnostic pressure monitoring and event management of fluid distribution systems of the utility data according to an example in this disclosure.

As discussed above, multiple types of utility systems have increasingly networked their infrastructure, and considerable data is generated from measurement points throughout these systems. However, the multiple types of utility systems may be disparate and siloed, and fragmented across these disparate and siloed systems resulting in disparate and siloed data. Thus, if the full context associated with the data is not known to an operator, the chances of successfully identifying an underlying problem or otherwise achieving a goal may be lower and/or the time and energy required to achieve the goal may be longer.

Some existing systems may remotely monitor pressure levels of fluid (e.g., gas, water, oil, sewer, etc.) in distribution networks of these utilities at a zonal-level at monitoring and control stations as fluid is transported in or out of a given zone. However, when a pressure impacting event has occurred, one or more of the types of utility systems (e.g., second types of utility systems) may lack the capability to remotely locate where the event has occurred within a given pressure zone, why it has occurred, identify the impacted service connections, and/or take action remotely from a back-office.

Many conventional utility systems (e.g., second types of utility systems) also lack proactive capabilities to monitor, identify, and address emerging events that will impact the management of pressure in their distribution network and/or cause service disruption or safety hazards for their customers. For example, a gas distribution utility may lack proactive capabilities to monitor, identify, and address an impending failure of a gas pressure regulator as it reaches end of life or due to freezing/flooding. One or more of the types of utility systems may deploy additional pressure sensing devices within the network that may improve accuracy, but these additional pressure sensing devices are expensive to purchase and/or maintain. While metering technology is available in the market that allows pressure to be monitored at substantially every input/output within the system, because of the fragmentation across these disparate and siloed systems and departments, personnel (e.g., back-office personnel) may lack comprehensive remote monitoring and control of pressure levels in their distribution network. Thus, while considerable data may be generated from measurement points located throughout a plurality of different types of utility systems and/or companies (e.g., data delivered from meters and/or sensors located at district monitoring locations and customer metering premises along with data from utility systems and other external sources), the data, alarms, tools, and processes are fragmented across the disparate, siloed systems and departments.

This application describes utility event management systems and methods that are commodity and technology agnostic solutions that provide pressure monitoring and event management of fluid distribution systems (e.g., gas systems, water systems, oil systems, sewer systems, etc.) and/or other utility systems (e.g., electricity systems). For example, one or more computing systems (e.g., central office server(s)) may utilize data delivered from meters and/or sensors located at distinct monitoring locations and customer metering premises along with data from utility systems and other external sources to identify occurring and/or emerging pressure impacting events, localize the location of those events, and provide tools to back-office personnel to take rapid targeted actions. For example, the one or more computing systems may utilize data delivered from first types of utility systems (e.g., Utility SCADA (supervisory control and data acquisition systems), Utility GIS (geographic information systems), Utility Hydraulic Models, Utility Work Order Management, etc.), data from second types of utility systems (e.g., utility technology companies offering products and services for energy and water resource management, gas and water distribution utilities, etc.), and/or data from third types of utility systems (e.g., third party applications, third party sensors, third party networks, third party meters, etc.). The data from the first types of utility systems may be disparate and siloed from each other and/or from the data from the second types of utility systems, and/or disparate and siloed from the data from the third types of utility systems.

The one or more computing systems may comprise an integration platform. When utilizing the data, the integration platform may act as a broker that is responsible for the integration and normalization of the data from across the multiple disparate systems and/or applications in use by a utility such as AMI (advanced metering infrastructure), SCADA (supervisory control and data acquisition), GIS (geographic information systems), hydraulic models, work order systems, ERP (enterprise resource planning), and from other relevant systems along with indirect data such as customer/operator notifications, 811 calls, fire dept interventions, etc. The integration platform may also be responsible for the synchronization of asset entity data amongst these systems such as pressure zones, stations, pipelines, meters, etc. and maintaining the relational hierarchy between these different entities. For example, the integration platform may include a device information service (DIS) component which may be the repository for asset entity data, the underlying attributes related to an asset, and the relationship of a given asset to other assets, where the synchronization refers to ensuring that DIS remains up to date with changes such as when an asset is updated/replaced/added.

The one or more computing systems may comprise an analytical engine. The analytical engine may be associated with the integration platform. The analytical engine may analyze time-series pressure data, alarms, and notifications delivered to it via the integration platform to identify anomalies, patterns, and correlations in the data for the purpose of generating events. For example, the analytical engine may analyze time-series pressure data, alarms, and notifications delivered to it via the integration platform using deterministic techniques (e.g., pattern matching, clustering, filtering, etc.) and/or machine learning models trained based on historical utility data and/or synthetic utility data.

The one or more computing systems may comprise an event management application. The events generated by the analytical engine may be delivered to the event management application. The event management application may be associated with the analytic engine. The events may be delivered to the event management application so that the events may be addressed by a user (e.g., back-office personnel). These events can be both scenarios that are occurring in real-time within the distribution network and/or a forecasted prediction of an event that is likely to occur in the future. The event management application may comprise a user-facing interface that provides the user with real-time situational awareness and response tools. Through the event management application users are made aware of problems, with descriptive information on what the problem is and the location in which the problem(s) have occurred, provided tools related to the management of an event lifecycle, and the ability to issue remote commands from a remote location (e.g., back-office) in response to those issues; such as for example to shut of gas and/or water to a particular zone, service connection, or group of service connections. These commands are then passed back through the integration platform to an applicable one of the first type of utility systems, second type of utility systems, and/or the third type of utility systems, etc. for execution.

In an example, assume a low-pressure alert at a regulator station ABC has been detected. The integration platform receives data representing the low-pressure alert from the regulator station ABC. The integration platform integrates and normalizes the data representing the low-pressure alert received from the regulator station ABC into a uniform structure/format (e.g., uniform data format) that can be understood by various common applications. The uniform/format may be a common event format (CEF) that provides a common format for transferring event data between systems, where alarm events are also sometimes referred to as status events or current events. Key data fields within the CEF may include device ID, device type fields, date and/or time stamps, event ID, event type and category codes, event description fields, event status fields (e.g., whether conditions for triggering an event remain active or have been resolved), sensor readings associated with the alarm and/or event, and/or generic event data fields that may be populated with additional data and/or information pertaining to the event. The integration platform may use the CEF to format event data for transfer between collection engines, mobile devices, meter data management solutions, and analytics applications. Collection systems, devices, and applications that handle event data may have a set of event codes to identify the types of collection systems, devices, or events that generated the event data along with a unique ID for a given event and a date/timestamp identifying when the event was generated. These data elements may be used by the integration platform to map a source system's event codes into the schema provided by the CEF for delivery to the receiving system. The receiving system may use these event codes from the source system contained within the CEF to map against its own internal list of event codes. This mapping may allow the receiving system to consolidate event codes from different external systems into one internal event code to make reporting and presentation in a user interface easier for the user.

Continuing with the example above, the integration platform may deliver the integrated and normalized data to the analytical engine. The analytical engine may include a map of a distribution network. The map of the distribution network indicates the regulator station ABC is located at a particular area within the distribution network and associated with a pressure zone. The map of the distribution network also indicates a plurality of meters dispersed within the pressure zone. The analytical engine may also incorporate a hydraulic model of the distribution network, which allows it to understand how fluid is expected to flow throughout the distribution network (i.e., direction, flow rate, pressure levels, temperature, etc.). Thus, the analytical engine understands the relationships and hierarchy between the pressure zone, the regulator station ABC associated with the pressure zone, and the plurality of meters dispersed within the pressure zone.

For example, the analytical engine understands the pressure zone is associated with the regulator station, the plurality of meters are associated within the pressure zone and related to the regulator station. If there is an event and/or an alarm that gets triggered by monitoring equipment disposed at the regulator station ABC, and if there are one or more events and/or alarms that get triggered by one or more of the plurality of meters that are disposed within the pressure zone, and/or there has been a measurement of a drop in pressure and/or a spike in pressure measured by one or more of the plurality of meters, these events and/or alarms are time stamped and correlated with each other based on the relationship and hierarchy between the pressure zone, the regulator station, and the plurality of meters.

Thus, the analytical engine makes correlations between different pieces of data based on time stamps, geographic locations, and hierarchical relationships. This may be done by deterministic techniques (e.g., pattern matching) and/or machine learning models trained based on historical data. For example, the analytical engine may utilize deterministic techniques to make correlations between the different pieces of data based on time stamps, geographic locations, and hierarchical relationships and/or machine learning models trained based on historical data to make correlations between the different pieces of data based on time stamps, geographic locations, and hierarchical relationships. Additional details and examples are described further below.

Deterministic approaches employ rules and guidelines to provide repeatable, predictable or formulaic outputs. Deterministic techniques are effective to identify events with known patterns. Deterministic techniques may include mathematical functions, pattern matching, filtering, comparison, and clustering, for example. For example, envision a simple example in which the analytical engine might use received alerts over time. The analytical engine may use clustering algorithms to cluster all alerts that happened within a threshold amount of time and within a threshold area (by referencing the Geographic Information System (GIS) to determine the locations of the alerts). The analytical engine may then look at the distribution network topology to identify one or more upstream parent nodes (e.g., a valve, regulator, etc.) that are shared by all or a threshold percentage of the nodes one or more of the clusters. From this, the analytical engine may be able to determine a root cause of the problem (e.g., a leak in a water main or branch line, a leaking valve, a failing regulator, etc.) that resulted in the alerts.

Other approaches that could be used include probabilistic models such as machine learning (ML) models, which are trained based on training data such as historical data (e.g., prior utility data, service site data, and/or third-party data) that has been labeled with ground truth. In addition to or instead of historical data, the training data may include synthetic data which represents a simulated utility environment. In some examples the synthetic data may be generated by starting from historical data and perturbing one or more parameters of the historical data to provide additional and/or more varied training data to use to train the ML models. The training data may include a wide variety of different parameters, depending on the type(s) of training data included. By way of example and not limitation, the parameters may include or represent consumption data, flow rate data, pressure data, voltage data, current data, network signal traffic, settings, control signals, weather data, work orders, etc. The ground truth can include semantic labeling of specific pieces of data that represented particular events that actually occurred (a water leak, failing or failed valve, power outage, etc.). From this training data, the machine learning models can learn to identify and infer patterns and relationships in the data. Once trained, the ML models can then be used to determine a probability that similar types of events are occurring in new data. Such ML models can often identify complex patterns and relationships in data that would be impossible or impractical for a human user to discern due to the speed required and/or volume of data involved.

Neural networks are one type of machine learning models that could be used in the analytics engine to determine probabilities of the various events. An exemplary neural network is an algorithm which passes input data through a series of connected layers to produce an output. Each layer in a neural network may also comprise another neural network, or may comprise any number of layers (whether convolutional or not) and may generate an output based on learned parameters (including but not limited to any of the parameters described herein). Other types of machine learning may additionally or alternatively be used such as, for example and not limitation, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), Support Vector Machine (SVM), supervised learning, unsupervised learning, semi-supervised learning, etc.

In one example of the techniques, utility data is obtained from a plurality of utility systems. For example, utility data may be obtained from one or more of meters, networks, sensors, and/or applications of a utility technology company, utility SCADA, utility GIS, utility hydraulic models, utility work order management, third party applications, third party sensors, third party networks, and/or third party meters. The utility data may be related to gas, water, oil, steam, sewer, electricity, etc. The utility data may include measurement information indicating consumption and other measures at endpoints, meters, transformers, switches, substations and/or other devices and points throughout the utility systems. The utility data may also include utility events, exceptions and/or other utility system or operational data. Utility events may include activities such as a low-pressure alert, a work order, declining pressure levels, a fault event, a false positive meter event, a power-down of service event, a low voltage event, power outage event, transformer failure event, de-energization of a distribution line event, and/or conservation event. Exceptions may include anomalous measurements or other data. Such anomalies may indicate a possible problem. For example, significantly increased consumption may indicate a broken water pipe. Additionally, the data may be analyzed using one or more relevant attributes, such as characteristics of the consumer, network and/or environment. Examples of attributes include information that was not obtained from metering devices, such as demographic information (e.g., the consumer is a restaurant, or the consumer's house is over-sized), environmental information (e.g., it's a cold winter day) or economic information. Additionally, attributes and/or a connectivity model or network topology may be used to derive the utility events. Such a connectivity attribute and/or connectivity model can show devices that are connected and/or related to a particular device or node on the network or grid. Such attributes may be used and helpful in deriving utility events.

Utility events may be useful combinations and/or sequences found in data. They may be identified in real-time or near real-time. They are valuable in that they may be used to monitor and improve the operational health of a utility system, indicate potential safety issues, or for other purposes. A utility event may be formed of "building blocks" including measurement data, exceptions, events, attributes, previously identified utility events, and/or groups or patterns of previously identified utility events.

An event derivation, event inference and/or pattern-based data filtration and/or examination process may be used to identify utility events. The utility data may be filtered or examined to identify patterns of data elements. The patterns may include at least one measurement, exception and/or event. The patterns may be selected and/or based on one or more attributes that are relevant to a consumer. The utility data may be compared to a number of patterns to search for a number of respective utility events. Thus, a utility event may be discovered based at least in part on measurements, exceptions, events, attributes, and previously identified utility events. In a specific example, a low-pressure alert at a regulator station event, followed by measurements including a drop in pressure and/or a spike in pressure measured by one or more of a plurality of meters disposed in a pressure zone associated with the regulator station, may indicate a utility event (e.g., a leak event, a low-pressure event, a high-pressure event, an impending failure event, etc.). Such utility events, which may be derived by recognition of a plurality of indicative data elements, may indicate a conservation utility event that may include events that relate to utility losses, such as water or gas leaks, and/or other events that indicate loss to a utility system. As discussed above, the utility events may be reported to the event management system.

The event management system may report the utility events to an operator through operation of a user-facing interface. In one example, the utility events may be prioritized and reported to an operator. In other examples, utility events may be used to initiate action through operation of automated systems. For example, the utility events may be used to initiate commands, via the integration platform, to an applicable one of the first type of utility systems, second type of utility systems, and/or the third type of utility systems, etc. for execution.

As discussed above, the user-facing interface may be used to provide the back-office personnel with real-time situational awareness and response tools. Through the event management application users are made aware of problems, with descriptive information on what the problem is and the location in which the problem(s) have occurred, provided tools related to the management of the event lifecycle, and the ability to issue remote commands from the back-office in response to those issues.

The discussion herein includes several sections. Each section is intended to be an example of techniques and/or structures, but is not intended to indicate elements which must be used and/or performed. A section entitled "Example System and Techniques" discusses example structures and implementations that scan and filter measurement data, exception data and event data. Additionally, the example structures perform pattern-matching functionality to locate and/or infer utility events. A section entitled "Example User Interface" discusses example output of real-time situational awareness and response tools. A section entitled "Example Methods" discusses aspects of methods operational in devices including processors, memory devices, application specific integrated circuits (ASICs), etc. In particular, the example methods may be applied to any of the techniques discussed herein, including those of the following sections.

Example System and Techniques

FIG. 1 illustrates a block diagram showing an example utility system 100 from which utility data may be obtained along with example one or more computing systems 102, such as central office server(s), configured as part of a central office 104 according to an example in this disclosure. The one or more computing systems 102 may be configured for performing techniques of pressure monitoring and event management of fluid distribution systems (e.g., gas systems, water systems, oil systems, sewer systems, etc.) according to an example in this disclosure. The central office 104 may communicate over one or more network(s) 106, such as the Internet, with one or more nodes 108(1), 108(2), 108(3), 108(4), 108(5), 108(6), 108(7), 108(8), 108(9), 108(10), 108(11), 108(12), 108(13), 108(14), and 108(N) in one or more networks 110(1), 110(2), and 110(N) associated with the utility system 100. The central office 104 may receive data from, and transmit data to, the nodes 108(1)-108(N) of the one or more networks 110(1)-110(N). In one example, the nodes 108(1)-108(N) may comprise sensors, meters, regulators, pumps, stations, valves, etc. In one example, the one or more computing systems 102 may include an integration platform 112, an analytical engine 114, and an event management application 116.

The utility system 100 may include gas, water, sewer, steam and/or other utility systems. The elements of the utility system may be configured as a network(s), according to any desired strategy or architecture. The one or more networks 110(1)-110(N) may include a mesh network (e.g., network 110(1)) and/or a star network (e.g., network 110 (N)), which are but two network architectures according to which the utility system 100 may be configured.

The mesh network includes a plurality of nodes (e.g., nodes 108(1)-108(5)), which represents any number of nodes. The nodes may be associated with meters, regulator stations, zones, pressure zones, transformers, switches, substations, any supervisory control and data acquisition (SCADA) device, etc., and more generally with any circuit and/or system element with which one-way or two-way communication is desired. Within the mesh network, the nodes communicate with each other to relay information in a downstream direction and/or an upstream direction. Accordingly, the central office 104 may establish and conduct communication with the nodes, and may receive data from one or more of the nodes suitable for filtering and processing for utility events.

Within the star network, a central node (e.g., node 108 (11)) communicates with one or more downstream nodes, represented by nodes 108(12)-108(N). The star network may include downstream flows of information and/or upstream flows of information. Accordingly, the central office 104 may establish and conduct communication with the nodes, and may receive data from one or more of the nodes suitable for filtering and processing for utility events.

The one or more networks 110(1)-110(N) may represent different types of utility systems. For example, the network 110(1) may represent a first type of utility system (e.g., Utility SCADA (supervisory control and data acquisition system), Utility GIS (geographic information system), Utility Hydraulic Model, Utility Work Order Management, etc.). The network 110(2) may represent a second type of utility system (e.g., utility technology companies offering products and services for energy and water resource management, gas and water distribution utilities, etc.). The $N^{th}$ network 110 (N) may represent a third type of utility system (e.g., third party Applications, third party Sensors, third party Networks, third party Meters, etc.). The data from the first type of utility system may be disparate and siloed from data from the second type of utility system, and/or disparate and siloed from data from the third type of utility system. Because the first type of utility, the second type of utility, and the third type of utility may be disparate and siloed, the integration platform 112 performs transformation and brokering of data between the first type of utility system, the second type of utility system, and the third type of utility system. The integration platform 112 provides a central point of integration from customer systems into a suite of applications in order to reduce integration costs for customers.

The integration platform 112 performs its operations through adapters. Adapters provide for a loosely coupled, scalable, distributed approach to implementing and enhancing functionality. An adapter implements a specific functionality, performing some step in an overall integration scenario. The adapters can be classified based on type, direction, external system, external data format, internal data type and/or transport technology, for example. Adapters may be plugged in to the integration platform 112 as components. A component represents an endpoint or step in the flow of an integration scenario. Transport adapters are communication mechanism to transfer the data from external systems to the integration platform 112 or from the integration platform 112 to external systems using a transport technology. The transport adapters play a role of a pipe connecting data. The transport adapters are a communication mechanism to transfer data from one or more external systems to the integration platform for consumption and/or to transfer data from the event management application 116 to the external system(s). The data is placed in a cache by transport adapters for it to be picked up by transform adapters. Transform adapters transform the source/target message format to normalized format to be picked by the transport adapters to send to other systems (e.g., analytical engine 114, event management application 116, etc.). The integration platform 112 handles messages going both directions (upstream from the disparate and siloed systems to the analytical engine 114 and the event management application 116, as well as downstream from the analytical engine 114 and event management application 116 to the disparate and siloed systems and even to the individual devices associated with the disparate systems (e.g., meters, valves, relays, transformers, etc.).

After the integration platform 112 integrates and normalizes the data from across the multiple disparate systems and/or applications (e.g., the data between the first type of utility system, the second type of utility system, and the third type of utility system), the integration platform 112 may deliver time-series pressure data, alarms, and notifications to the analytical engine 114. The analytical engine 114 may analyze the time-series pressure data, the alarms, and the notifications delivered to it via the integration platform 112 to identify anomalies, patterns, and correlations in the data for the purpose of generating events. In an example, alarms and/or events may be generated by algorithms contained within the analytical engine 114 to facilitate the function and/or purpose of that algorithm. In another example, alarms/events may be generated by algorithms contained within the analytical engine 114 that analyze raw time-series data for the purpose of generating alarms/events. In another example, alarms and/or events may be generated by algorithms that analyze the outputs of various other algorithms (i.e., combination of algorithms) in order to generate an alarm and/or event. A derivation and/or inference process may be used with the data, to identify one or more utility events or other desired information. In another example, data received from the integration platform 112 may be filtered (e.g., by the use of patterns or templates) to infer or derive at least one measurement, exception or event. The filtration, derivation and/or inference process may be applied to vast quantities of data. The filtered data items may fit, and/or be consistent with, patterns of measurements, exceptions and/or events that indicate a utility event. The events can be both scenarios that are occurring in real-time within the one or more networks 110(1)-110(N) and/or a forecasted prediction of an event that is likely to occur in the future. For example, and as discussed above, the analytical engine 114 may contain a collection of different fit-for-purpose algorithms that may work individually and/or in combination with each other to generate the different types of alarms/events that are delivered to the event management application 116. For example, some algorithms may be used for real-time events, while other algorithms may be used for near real-time/latent/historical events, and/or other algorithms may be used for forecasted events. In an example, real-time alarms may be generated by a sensor device that has detected some threshold being exceeded resulting in an alarm being generated, immediately communicated, and then visualized within the event management application 116 while triggering an algorithm that attempts to localize the cause of the problem in real/near-real time. In another example, near real time/latent/historical events may be generated by algorithms that run on a periodic basis (e.g., algorithms that run every hour(s)/day/week/month) that analyze datasets over different timeframes that generate events based upon this analysis. In another example, forecasted events may be generated by algorithms that are analyzing current and historical datasets to create a prediction of something that is considered likely to occur in the future based upon prior history. As mentioned above, the algorithms described herein may be implemented by deterministic techniques, machine learning techniques, or combinations thereof.

The analytical engine 114 may use a utility's hydraulic model (which provides information regarding the flow path of gas/water through a distribution network and expected pressure levels) and data from the utility's Geographic Information System (GIS) which provides information on the location of pressure zones, pipe, pumps, pressure regulator stations, and valves along with characteristics surrounding those assets including minimum/maximum allowable pressure. The combination of the hydraulic model and GIS data creates a digital representation of the distribution network and a simulation of how it is expected to behave. The analytical engine 114 may also process alarms and events from meters/sensors or external applications. These alarms/events have timestamps and location data associated with them. The analytical engine 114 may also process time-series pressure data from meters and sensors installed in locations throughout distribution network which provides data on how the distribution network is actually behaving. The combination of these data are used to 1) calibrate the hydraulic model; 2) identify anomalies or deviations from the expected behavior; and/or 3) correlate those anomalies/deviations with alarms that have been triggered by a meter/sensor or delivered by some external application.

For example, the analytical engine 114 may receive an event that a work order #123 is being completed on mm/dd/yyyy date to install underground fiber optic cable at a particular location in a city that is near a gas line. The analytical engine 114 engine receives pressure readings from gas meters/sensors installed elsewhere in the distribution network that are lower than expected. The analytical engine 114 knows those gas meters/sensors are installed downstream of the work order #123 because the analytical engine 114 understands the hydraulic model and the location of the meters relative to the work order #123. The analytical engine 114 identifies the correlation between the work order #123 is being completed on mm/dd/yyyy date and a corresponding drop in pressure at locations downstream of that work order. The analytical engine 114 uses the identified correlation to generate an event representing the work order #123 suspected to have caused a gas leak in this area.

As another example, the analytical engine 114 may identify distribution network transient pressure events. Transient pressure events or "transients" are short-lived pressure surges or waves caused when the flow within a network is forced to suddenly stop, change direction or change momentum. Transients often cause or contribute to hydraulic failure within distribution networks and can damage distribution assets. The analytical engine 114 may contain an algorithm configured to analyze time-series pressure data to identify when relatively large pressure changes occur across relatively short time frames to generate a severity score for the swings in pressure levels. Relatively large pressure changes that happen relatively quickly result in a higher score, while relatively smaller changes over a relatively longer period result in a lower score. A threshold may be defined in terms of pressure change (X) that occurs within finite period of time (Y) for the severity score to trigger a transient pressure event. In an example embodiment according to this disclosure, a fluctuation in pressure of at least about 10 psi to at most about 20 psi over a course of seconds or a couple minutes may be considered a significant pressure event. The higher the change in pressure between the peaks and troughs of the waveform, the higher the number of the peaks and/or troughs in the waveform, and over the shorter the timeframe, the more significant the event. The analytical engine 114 may determine that a severity score is greater than or equal to a threshold and based at least in part on the severity score being greater than or equal to the threshold, generating a transient pressure event.

As another example, the analytical engine 114 may classify distribution network transient pressure events. The analytical engine 114 may contain an algorithm that may be used to analyze a shape of a transient waveform and compare that shape of the transient waveform against existing transient waveforms of existing events to classify similar and repeated events together. The analytical engine 114 may classify an event as a sharp pressure drop. This label may identify events containing pressure drops with steep gradients, which could be an indication of harmful network operations, breaks or failures. The analytical engine 114 may classify an event as a possible pump stop. This label may identify events containing pressure drops with steep gradients as above, but if the source site is identified as being near a pump station, this label may indicate that a pump stop may be the cause. The analytical engine 114 may classify an event as a negative pressure. This label may identify any events containing negative pressure samples. The analytical engine 114 may classify an event as an oscillation. This label may identify waveforms that consist predominantly of pressure oscillations, where a pressure oscillation event may refer to a repeated fluctuation in pressure, where a pressure level rises and falls in a cyclical manner over time, rather than remaining at a constant level.

As another example, the analytical engine 114 may detect operating threshold events. The analytical engine 114 may contain various fit-to-purpose algorithms that may be used to monitor data streams of time-series data and/or alarms and/or events associated with an entity (i.e., a zone, a device, a sensor, a service point, a pump, etc.) in order to raise an alarm when those values go beyond a defined threshold limits, where the limits may be defined by a utility company based on product specifications and/or standards). For a first example, if a sensor detects relatively higher or relatively lower pressure levels that exceed acceptable thresholds. For a second example, if the mean pressure level across a zone and/or an area of the distribution network is detected to be relatively higher or relatively lower levels that exceeds acceptable thresholds. As a third example, if a defined threshold is exceeded for the number of alarms detected by sensors located within a common zone and/or a common area of the distribution network.

As another example, the analytical engine 114 may detect service regulator failures. The analytical engine 114 may contain various algorithms that may be used to identify pressure regulator valves that have failed or are in the process of failing based upon pattern analysis of time-series pressure data from a meter and/or a sensor installed downstream of the pressure regulator valve. Pressure regulator valves are mechanical devices that fail overtime. The analytical engine 114 may look at patterns from downstream devices and correlate multiple meters that are presenting the same or similar patterns to identify pressure regulator valves that have failed or are in the process of failing. For example, the analytical engine 114 may determine a likelihood of the failure of a pressure regulator valve based on at least one of pressure data analysis, prior failures of valves and the pressure data from downstream devices that occurred leading up to the failure, soil conditions at the location of the failure, precipitation and/or temperature at the location of the valve (e.g., flooding, freezing, etc.), specifications associated with devices, age of the valve and/or other equipment.

As another example, the analytical engine 114 may detect diurnal events. The analytical engine 114 may contain an algorithm configured to analyze historical time series data from a pressure sensor to evaluate the standard patterns and/or cycles of sensor values and compare that against newly reported sensor values to identify when new sensor readings are deviating too far beyond the expected patterns of behavior. These events can be early indication of future and/or emerging issues in the distribution network.

As another example, the analytical engine 114 may perform a distribution network event correlation. The analytical engine 114 may contain an algorithm that may use alarm and/or event timestamps, location data, and hierarchical links and/or relationships between entities (e.g., devices, sensors, service points, etc.) to detect correlations between alarms and/or events detected by or delivered to the utility system 100 that have occurred in the distribution network and resulted in some type of problem and/or impact that has propagated across the distribution network generating alarms and/or detection by more than one sensor.

As another example, the analytical engine 114 may perform a distribution network event localization. The analytical engine 114 may contain an algorithm that may use alarm and/or event timestamps, location data, and hierarchical links and/or relationships between the entities associated with the alarms, events, and/or patterns detected by or delivered to the utility system 100 to attempt to triangulate the location of the source of the problem.

As another example, the analytical engine 114 may perform a distribution network event forecast. The analytical engine 114 may contain an algorithm that may use current and historical datasets, alarm and/or event timestamps, location data, and hierarchical links and/or relationships between the entities to create a predication of something that is likely to occur in the future. For example, a machine learning model may be trained based on historical pressure data annotated with "prior failure history" of pressure regulator valves, utility asset management data (e.g., make, model, size, type, etc.) of regulator valves, historical pattern analysis data from pressure sensors associated with regulator valves, and/or a variety of other data sources such as weather and/or temperature to detect correlations amongst some or all of these variables in order to create a prediction that identifies pressure regulator valves that are most likely to fail in the future, predicted failure data, etc. Another example is a machine learning model trained based on historical pressure data annotated with historical weather and/or temperature sensor data associated with a pressure zone of the distribution network to generate a forecasted prediction of pressure within that zone in response to a current or forecasted future weather, and to generate an event to notify the utility if those predictions fall above or below an acceptable threshold. Another example is a machine learning model trained, based on historical pressure data annotated with hydraulic model data, to recognize how changes in upstream pressure affect downstream pressure levels and performance of specific devices.

After the analytical engine 114 generates data representing the events, the analytical engine 114 may deliver event data to the event management application 116. The event management application 116 may provide users with real-time situational awareness and response tools. Through the event management application 116, users may be made aware of problems, with descriptive information on what each problem is and the location in which the problem (or problems) has occurred. The event management application 116 may provide tools related to the management of an event lifecycle. The event management application 116 may issue remote commands from a remote location (e.g., back-office) in response to those problems; such as for example to shut of gas and/or water to a particular zone, service connection, or group of service connections. These remote commands are then passed back through the integration platform 112 to an applicable one of the first type of utility systems, second type of utility systems, and/or the third type of utility systems, etc. for execution.

Figure 2:
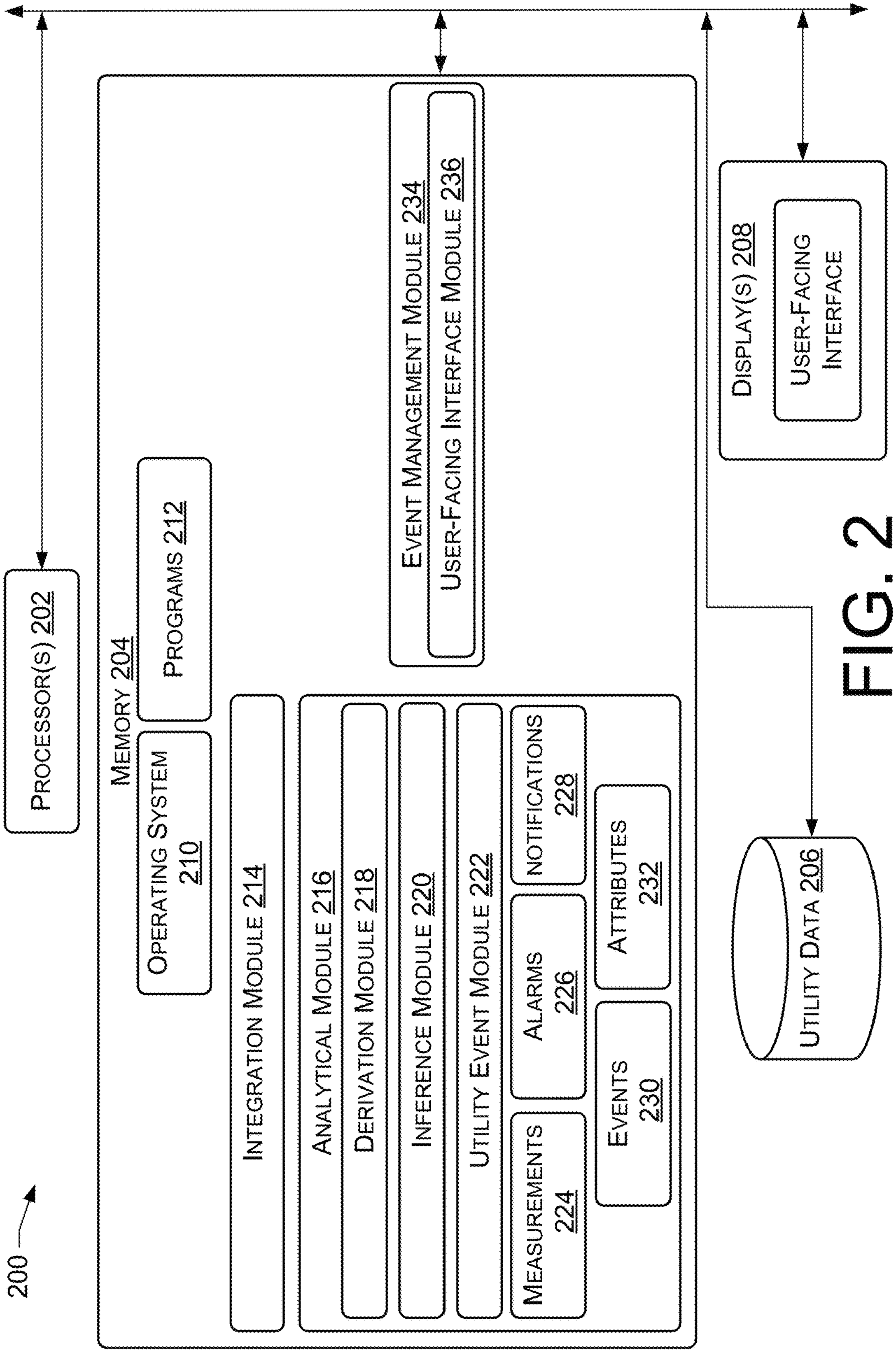
FIG. 2 illustrates a block diagram showing an example computing device, such as a central office server of FIG. 1, for analyzing, contextualizing, and visualizing the utility data according to an example in this disclosure.

FIG. 2 is a block diagram showing example structure of a utility system 200 configured for performing techniques of pressure monitoring and event management of fluid distribution systems in the utility system 100 according to an example in this disclosure. The utility system 200 is representative of systems that may be operated by the central office 104 of FIG. 1 or other location, as desired. The utility system 200 may include one or more processors 202 and memory 204. In the example shown, utility data 206 may be obtained from the plurality of nodes 108(1)-108(N) of FIG. 1 and/or a plurality of network devices; and may be stored on a high-capacity data storage device. A display 208 may include a view screen or other input/output device which may display a user-facing interface to an operator or other user.

The memory 204 may include an operating system 210 and one or more programs 212. One or more of the program(s) 212 may be configured for utility data analysis in the utility system 100 of FIG. 1. The programs may be centrally located at a central office or back office, or may be distributed over a network with portions of code executed at a plurality of locations. Such programs may receive, filter and/or interpret data from the nodes 108(1)-108(N) of the one or more networks 110(1)-110(N) of FIG. 1. The data may be filtered, pattern-matched and/or analyzed to derive or infer at least one measurement, exception, event, and/or sequences of events. The filtered data items may be examined for fit and/or consistency with patterns of measurements, exceptions, events and/or attributes that indicate a utility event. Such utility events may have value to an operator or the system generally, in that they may indicate issues of utility functionality—such as pressure quality, device failure, leaks, and/or other concerns. The filtered data items (e.g., data events) and/or sequences of events may be examined to identify descriptive information on what the problem is and the location in which the problem(s) have occurred, provide tools related to the management of the event lifecycle, and issue remote commands from the back-office.

An integration module 214 may act as a broker that integrates and normalizes the utility data 206 from across the multiple disparate systems and/or applications. For example, the integration module 214 may act as a broker that integrates and normalizes data in use by the one or more networks 110(1)-110(N) (e.g., first type of utility systems, the second type of utility systems, and/or the third type of utility systems).

An analytical module 216 may include a derivation module 218, an inference module 220, and/or a utility event module 222 to identify anomalies, patterns, and correlations in the utility data 206 for the purpose of generating events. The analytical module 216 may utilize the derivation module 218, the inference module 220, and or the utility event module 222 to locate one or more data elements that may be relevant with respect to the identification of one or more utility events. In the example shown, the analytical module 216 may filter and/or identify relevant or filtered data elements from among potentially vast quantities of the utility data 206. In the example, the filtered data elements may include time-series pressure data, alarms, and notifications. For example, the analytical module 216 may analyze time-series pressure data, alarms, and notifications delivered to it via the integration module 214 using deterministic techniques (e.g., pattern matching) and/or machine learning models trained based on historical utility data. Thus, in the example of FIG. 2, the analytical module 216 filters the utility data 206 for data elements, which may include time-series pressure data measurements 224, alarms 226, and/or notifications 228 for the purpose of generating events 230. Accordingly, the utility data 206 may be filtered by comparison to known patterns of measurements, exceptions, events and/or attributes that indicate a utility event. In one example, the analytical module 216 may include one or more patterns associated with one or more utility events. Thus, one or more patterns may be compared to filtered data elements to identify and/or infer existence of one or more utility events. The time-series pressure data measurements 224, alarms 226, notifications 228, and/or events 230 identified by any particular filter may be considered to be "building blocks" which indicate and/or infer the existence of a particular utility event.

The analytical module 216 may also consider one or more attributes 232. The one or more attributes 232 may include information that is beyond the scope of the data collected from meters, transformers, switches, substations, valves, etc., of the utility system and/or network. Accordingly, the one or more attributes 232 may include information such as demographic information about specific consumers and/or aggregated demographic information about consumers in an area or neighborhood. The one or more attributes 232 may include almost any useful information, such as the nature of the consumer (restaurant, house, etc.), the nature and consumption habits of such consumers, the time of day, the date and the year. The one or more attributes 232 may include information about weather, climate and economy, customer history, prior events at the location, etc. The one or more attributes 232 may also include information obtained from the utility system or network, such as information associated with events. Examples of such attributes include duration of a low-pressure event, duration of a high-pressure event, magnitude of a pressure spike event, magnitude of a pressure drop, magnitude of a leak, an outage event, magnitude of a voltage spike event, value of a low voltage event or measurement, a drop and/or increase in a read rate, a drop and/or increase in consumption, decrease and/or increase use on transformers, a transformer failure event, a de-energization of a distribution line event, a conservation event, a power-down event, a power-up event, a power outage event, etc. A utility event may be recognized based on association of these attributes with recognized data elements, defined patterns and/or previously recognized utility events. In operation, the analytical module 216 may match and/or consider the filtered data elements together with any of a number of the one or more attributes 232 in operations that derive, infer and/or detect one or more utility events. In a specific example, a work order attribute may indicate that utility service personnel were on site during a utility water line replacement suspected to have caused a gas leak event and therefore the event should be given higher or lower priority, depending on context.

An event management module 234 may comprise a user-facing interface module 236. The events 230 generated by the analytical module 216 may be delivered to the event management module 234. The events 230 may be delivered to the event management module 234 so that the events 230 may be addressed by a user (e.g., back-office personnel). For example, the user-facing interface module 236 may provide the user with real-time situational awareness and response tools via the user-facing interface. For example, through the event management module 234 users are made aware of problems, with descriptive information on what the problem is and the location in which the problem(s) have occurred, provided tools related to the management of an event lifecycle, and the ability to issue remote commands from a remote location (e.g., back-office) in response to those issues.

Example User Interfaces

Figure 3:
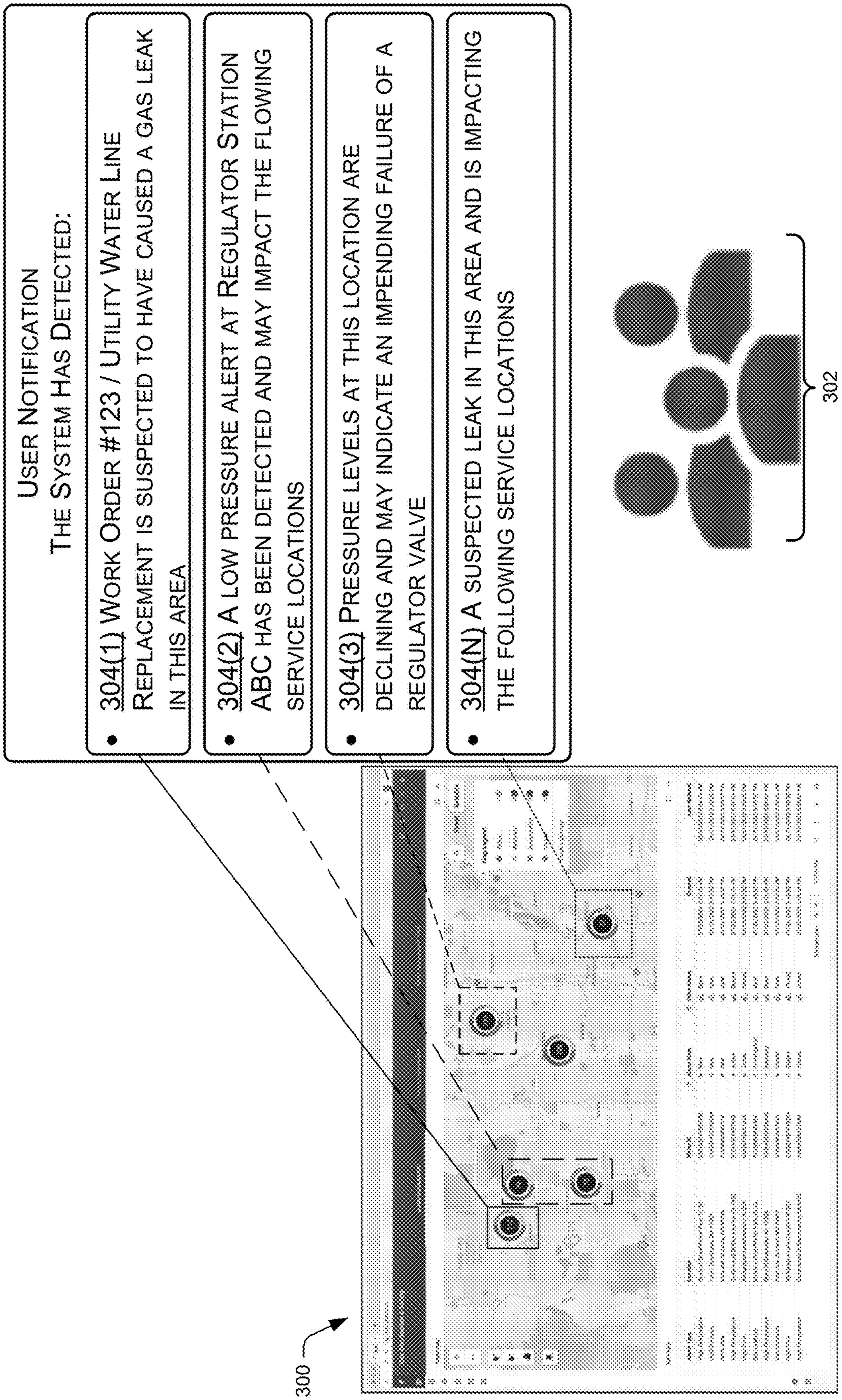
FIG. 3 illustrates an example user-facing interface that may be provided by an event management application 116 of FIG. 1 according to an example in this disclosure.

FIG. 3 illustrates an example user-facing interface 300 that may be provided by the event management application 116 of FIG. 1 according to an example in this disclosure. The user-facing interface module 236 of FIG. 2 may cause the user-facing interface 300 to be displayed to one or more users 302 (e.g., back-office personnel) with real-time situational awareness and response tools. The one or more users 302 may be made aware of one or more problems 304(1), 304(2), 304(3), and 304(N), via descriptive information on what the problem is and the location in which the problem(s) have occurred. The user-facing interface 300 may provide tools related to the management of the event lifecycle. The user-facing interface 300 may provide the ability to issue remote commands from the back-office in response to the one or more problems 304(1)-304(N). For example, the user-facing interface 300 may provide tools such as for example commands to shut of gas/water to a particular zone, service connection, or group of service connections. These commands may then be passed back through the integration platform 112 to the applicable system/application for execution.

Example Methods

In some examples of the techniques discussed herein, the methods of operation may be performed by software defined on memory and/or application specific integrated circuits (ASIC). The memory 204 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

Figure 4:
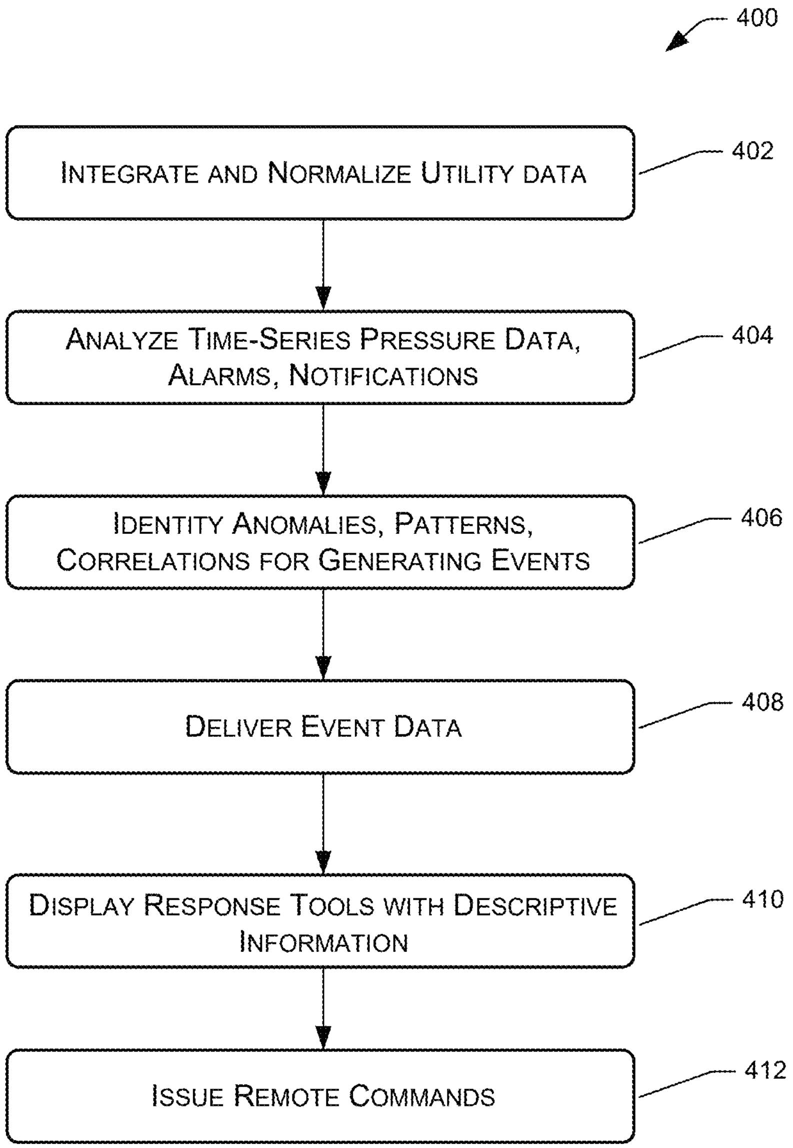
FIG. 4 is a flow diagram showing an example method for performing techniques of pressure monitoring and event management of fluid distribution systems of a utility system of FIG. 1 according to an example in this disclosure.

FIG. 4 is a flow diagram showing an example method 400 for performing techniques of pressure monitoring and event management of fluid distribution systems (e.g., gas systems, water systems, oil systems, sewer systems, etc.) of a utility system (e.g., utility system 100 of FIG. 1) according to an example in this disclosure. In one example, data may be filtered to obtain measurements, exceptions, and events, and/or sequence of events. The filtered data items may be examined for fit and/or consistency with patterns of measurements, exceptions, events and/or attributes that indicate utility events. Once identified, utility events may be prioritized and reported to an operator or utility system through operation of a user-facing interface, automated notification system, or automated utility system that may take action with or without human intervention. Examples of utility events include pressure quality, device failure, leaks, and/or other concerns.

At operation 402, an integration platform (e.g., integration platform 112) may act as a broker that integrates and normalizes utility data (e.g., utility data 206) from across the multiple disparate systems and/or applications. For example, the integration platform may act as a broker that integrates and normalizes data in use by one or more networks (one or more networks 110(1)-110(N)).

At operation 404, an analytical engine (e.g., analytical engine 114) may analyze time-series pressure data, alarms, and notifications delivered to it via the integration platform. to identify anomalies, patterns, and correlations in the data for the purpose of generating events.

At operation 406, the analytical engine may identify anomalies, patterns, and correlations in the time-series pressure data, alarms, and notifications for the purpose of generating events.

At operation 408, the analytical engine may deliver event data to an event management application (e.g., event management application 116).

At operation 410, the event management application may display, via a user-facing interface, real-time situational awareness and response tools with descriptive information on what the problem(s) is and the location in which the problem(s) have occurred.

At operation 412, the event management application may issue remote commands from a remote location (e.g., back-office) in response to the problem(s).

Figure 5A:
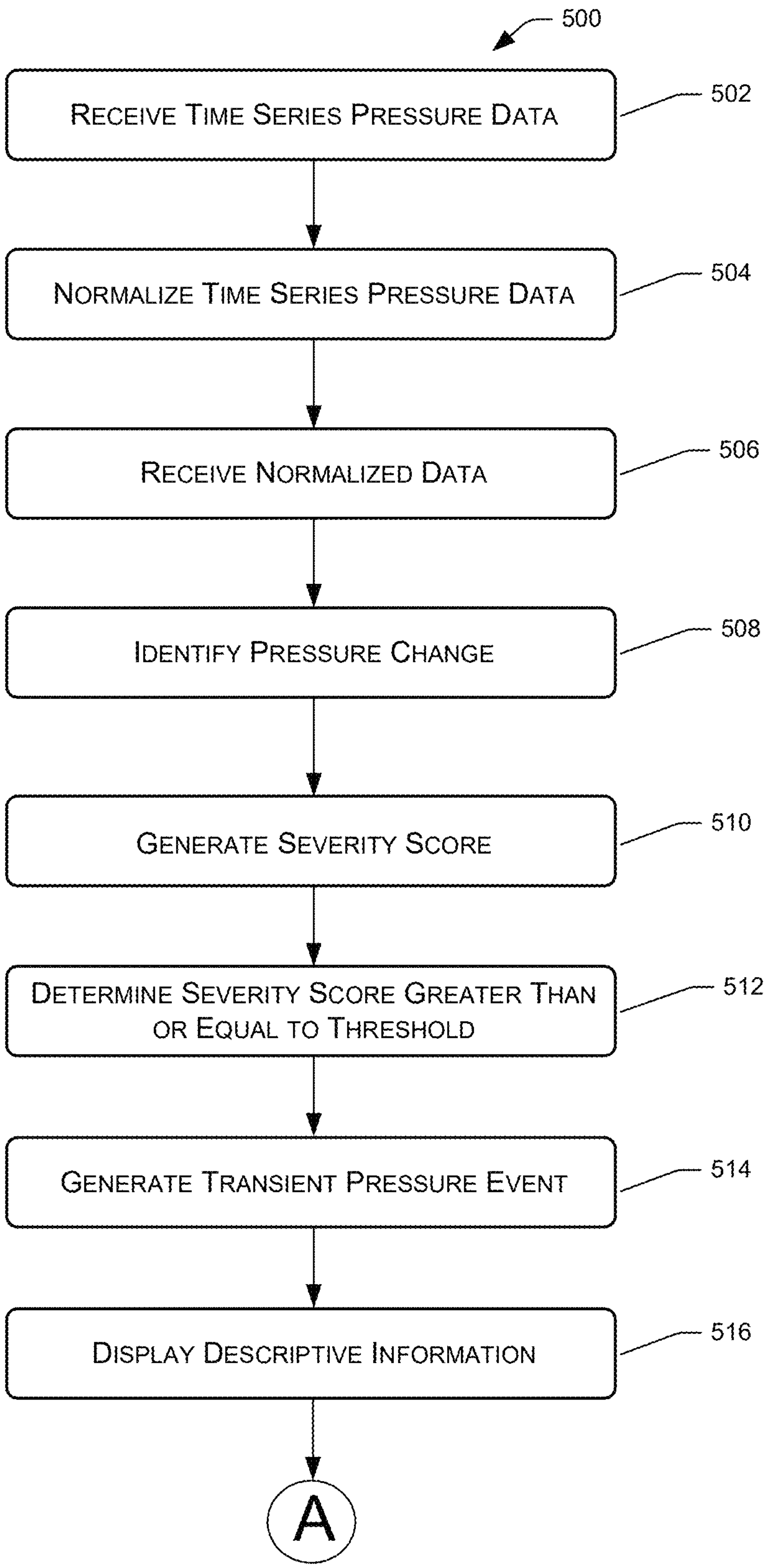
FIGS. 5A and 5B are a flow diagram showing an example method for performing techniques of identifying and classifying distribution network transient pressure events of a utility system of FIG. 1 according to an example in this disclosure.
Figure 5B:
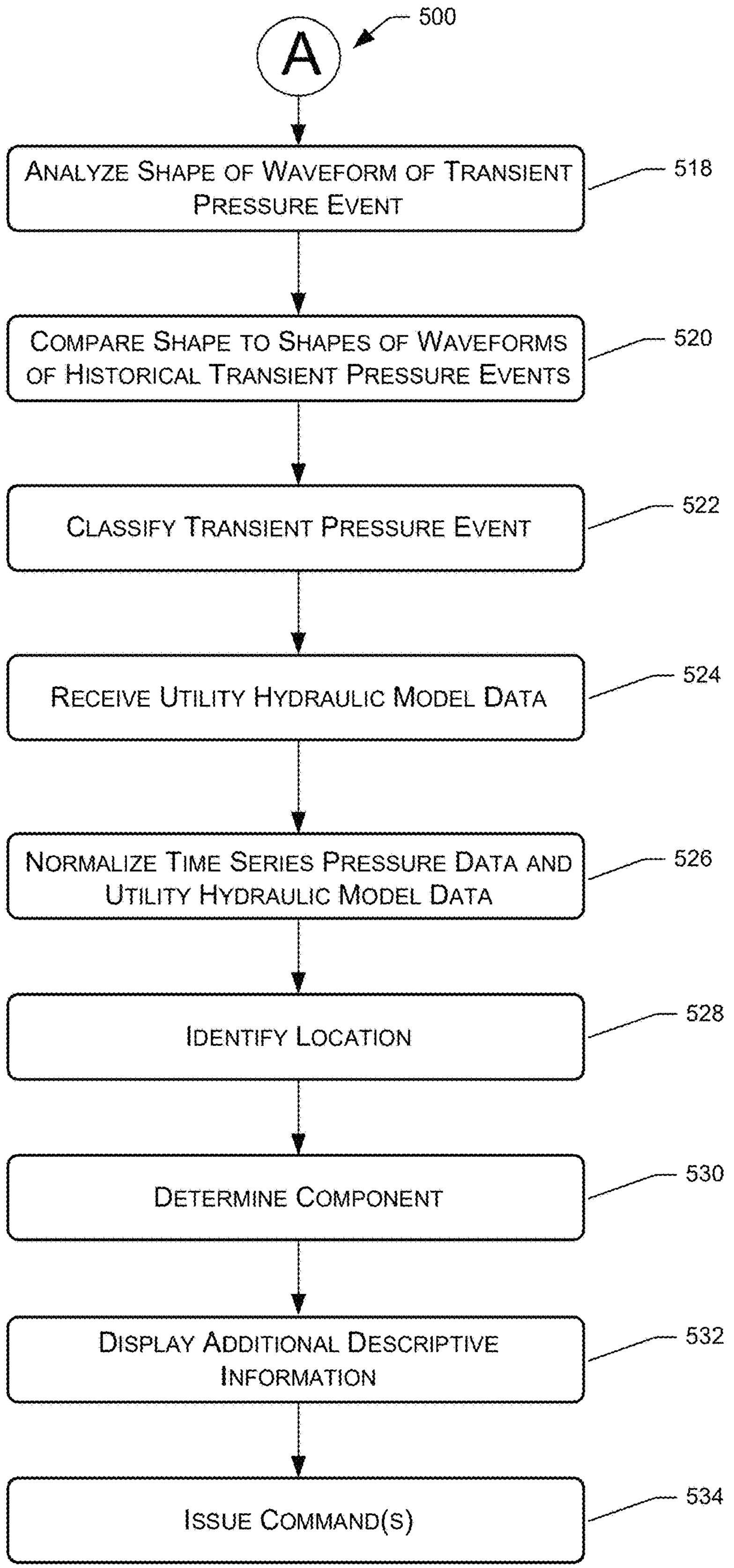

FIGS. 5A and 5B are a flow diagram showing an example method 500 for performing techniques of identifying and classifying distribution network transient pressure events of a utility system according to an example in this disclosure. In one example, data may be analyzed to identify when relatively large pressure changes occur across relatively short time frames to generate a severity score for the swings in pressure levels. Relatively large pressure changes that occur relatively quickly may result in a higher score and relatively smaller pressure changes over a relatively longer period may result in a lower score. A threshold may be defined for the severity score to trigger a transient pressure event. For example, an analytical engine may determine that a severity score is greater than or equal to a threshold and based at least in part on the severity score being greater than or equal to the threshold, generate a transient pressure event.

At operation 502, an integration platform (e.g., integration platform 112) may act as a broker that integrates and normalizes utility data (e.g., utility data 206) from across the multiple disparate systems and/or applications. For example, the integration platform may act as a broker that integrates and normalizes data in use by one or more networks (one or more networks 110(1)-110(N)). Operation 502 represents the integration platform receiving time series pressure data from a plurality of sensors (e.g., nodes 108(1)-108(N)) in a utility system (e.g., utility system 100).

Operation 502 may be followed by operation 504, which represents normalizing the time series pressure data to obtain normalized data. For example, the integration platform may integrate and normalize the time series pressure data to obtain normalized data.

Operation 504 may be followed by operation 506, which represents receiving the normalized data in a uniform data format. For example, an analytical engine (e.g., analytical engine 114) may receive the normalized data in a uniform structure/format. The uniform structure/format may be a common event format (CEF) that provides a common format for transferring event data between systems.

Operation 506 may be followed by operation 508, which represents identifying, based at least in part on the normalized data, a pressure change in a portion of the utility system. For example, the analytical engine may identify a pressure change in a portion of the utility system based at least in part on the normalized data. For example, the analytical engine may identify the pressure change in the portion of the utility system based at least in part on first time series pressure data received from a first sensor of the plurality of sensors and second time series pressure data received from a second sensor of the plurality of sensors, where at least a portion of the first time series pressure data is concurrent with at least a portion of the second time series pressure data.

Operation 508 may be followed by operation 510, which represents generating, based at least in part on the identifying of the pressure change, a severity score associated with the pressure change. For example, the analytical engine may generate a severity score associated with the pressure change based at least in part on the identified pressure change. For example, the analytical engine may generate the severity score based at least in part on a magnitude of the pressure change and a period of time over which the pressure change occurred.

Operation 510 may be followed by operation 512, which represents determining that the severity score is greater than or equal to a threshold. For example, the analytical engine may determine that the severity score is greater than or equal to the threshold.

Operation 512 may be followed by operation 514, which represents based at least in part on the severity score being greater than or equal to the threshold, generating a transient pressure event. For example, the analytical engine may generate a transient pressure event based at least in part on the severity score being greater than or equal to the threshold.

Operation 514 may be followed by operation 516, which represents displaying descriptive information identifying the transient pressure event and one or more response tools for responding to the transient pressure event. For example, an event management application (e.g., event management application 116) may provide a user-facing interface (e.g., user-facing interface 300) that may display one or more problems (one or more problems 304(1), 304(2), 304(3), and 304(N)), via descriptive information on what the transient pressure event is and one or more response tools for responding to the transient pressure event.

Method 500 continues with operation 518 at the upper right portion of FIG. 5B. Operation 518 represents analyzing a shape of a waveform of the transient pressure event. For example, the analytical engine may analyze a shape of a waveform of the transient pressure event.

Operation 518 may be followed by operation 520, which represents comparing the shape of the waveform of the transient pressure event to shapes of waveforms of historical transient pressure events.

Operation 520 may be followed by operation 522, which represents based at least in part on the comparing, classifying the transient pressure event as a particular type of transient pressure event. For example, the analytical engine may classify the transient pressure event as a particular type of transient pressure event that may comprise at least one of: a sharp pressure drop comprising a drop in pressure of at least about 10 psi within a threshold period of time (e.g., 10 seconds, 30 seconds, 1 minute, five minutes, etc.); a negative pressure; or an oscillation.

Operation 522 may be followed by operation 524, which represents receiving utility hydraulic model data associated with the utility system. For example, the integration platform may receive utility hydraulic model data.

Operation 524 may be followed by operation 526, which represents normalizing the time series pressure data and the utility hydraulic model data to obtain the normalized data. For example, the integration platform may normalize the time series pressure data and the utility hydraulic model data to obtain the normalized data.

Operation 526 may be followed by operation 528, which represents identifying, based at least in part on the normalized data, a location at which the transient pressure event occurred. For example, the analytical engine may identify a location at which the transient pressure event occurred based at least in part on the normalized data.

Operation 528 may be followed by operation 530, which represents determining, based at least in part on the particular type of transient pressure event and the location of the transient pressure event, a component of the utility system that is a likely cause of the transient pressure event. For example, the analytical engine may determine a component of the utility system that is a likely cause of the transient pressure event based at least in part on the particular type of transient pressure event and the location of the transient pressure event. For example, the analytical engine may determine that the particular type of transient pressure event comprises the sharp pressure drop, determine that the location at which the transient pressure event occurred is located within a threshold distance of a pump station, and then determine, based at least in part on the particular type being the sharp pressure drop and the location being within the threshold distance of the pump station, that the pump station is the likely cause of the transient pressure event.

Operation 530 may be followed by operation 532, which represents displaying additional descriptive information identifying the location at which the transient pressure event occurred. For example, the event management application may display additional descriptive information identifying the location at which the transient pressure event occurred.

Operation 532 may be followed by operation 534, which represents issuing, from a remote location, one or more commands in response to the transient pressure event. For example, the event management application may issue one or more commands in response to the transient pressure event from a remote location.

Figure 6A:
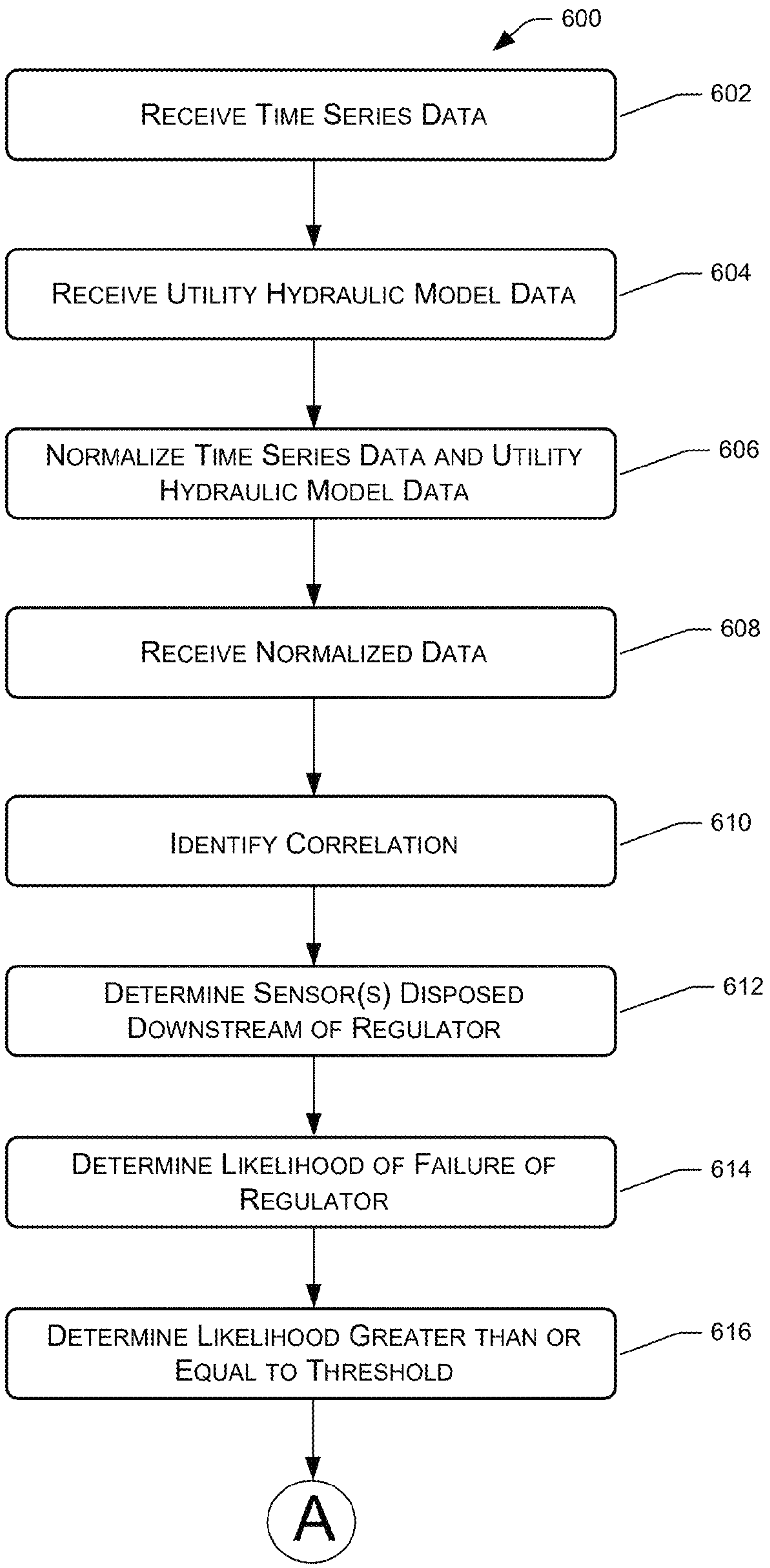
FIGS. 6A and 6B are a flow diagram showing an example method for performing techniques of detecting service regulator failures of a utility system of FIG. 1 according to an example in this disclosure.
Figure 6B:
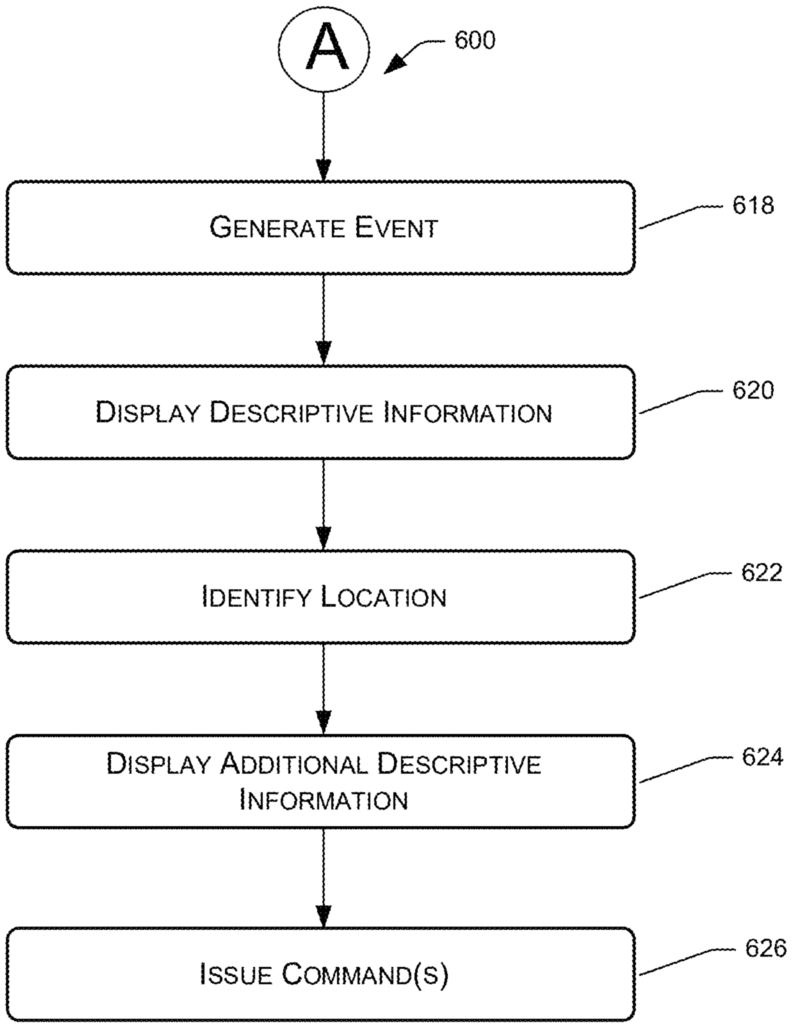

FIGS. 6A and 6B are a flow diagram showing an example method 600 for performing techniques of detecting service regulator failures of a utility system of FIG. 1 according to an example in this disclosure. In one example, data may be analyzed to identify pressure regulator valves that have failed or are in the process of failing based upon pattern analysis of time-series pressure data from a meter and/or sensor installed downstream of the regulator valve.

At operation 602, an integration platform (e.g., integration platform 112) may receive time series data from a plurality of sensors (e.g., nodes 108(1)-108(N)) in a utility system (e.g., utility system 100).

Operation 602 may be followed by operation 604, which represents receiving utility hydraulic model data associated with the utility system. For example, the integration platform may receive utility hydraulic model data associated with the utility system.

Operation 604 may be followed by operation 606, which represents normalizing the time series data and the utility hydraulic model data to obtain normalized data. For example, the integration platform may normalize the time series data and the utility hydraulic model data to obtain normalized data.

Operation 606 may be followed by operation 608, which represents receiving the normalized data in a uniform data format. For example, an analytical engine (e.g., analytical engine 114) may receive the normalized data in a uniform structure/format. The uniform structure/format may be a common event format (CEF) that provides a common format for transferring event data between systems.

Operation 608 may be followed by operation 610, which represents identifying, based at least in part on the normalized data, a correlation between first time series data associated with a first sensor of the plurality of sensors and second time series data associated with a second sensor of the plurality of sensors. For example, the analytical engine may identify a correlation between first time series data associated with a first sensor of the plurality of sensors and second time series data associated with a second sensor of the plurality of sensors based at least in part on the normalized data. In an example embodiment, the first time series data and the second time series data may exhibit changes in pressure over time that are associated with the failure of the regulator.

Operation 610 may be followed by operation 612, which represents determining, based at least in part on the utility hydraulic model data, that the first sensor and the second sensor are disposed downstream of a regulator for controlling a pressure of a product of the utility system. For example, the analytical engine may determine that the first sensor and the second sensor are disposed downstream of a regulator for controlling a pressure of a product of the utility system based at least in part on the utility hydraulic model data.

Operation 612 may be followed by operation 614, which represents determining, based at least in part on the first time series data and the second time series data and historical data associated with regulator failures, a likelihood of a failure of the regulator. For example, the analytical engine may determine a likelihood of a failure of the regulator based at least in part on the first time series data and the second time series data and historical data associated with regulator failures. In an example embodiment, the determining of the likelihood of the failure of the regulator may be further based on at least one of: soil analysis data; current temperature data; current precipitation data; specification data associated with the regulator; or an age of the regulator.

Operation 614 may be followed by operation 616, which represents determining that the likelihood is greater than or equal to a threshold. For example, the analytical engine may determine that the likelihood is greater than or equal to a threshold.

Operation 616 may be followed by operation 618, which represents based at least in part on the likelihood being greater than or equal to the threshold, generating an event. For example, the analytical engine may generate an event based at least in part on the likelihood being greater than or equal to the threshold.

Operation 618 may be followed by operation 620, which represents displaying descriptive information identifying the event and one or more response tools for responding to the event. For example, an event management application (e.g., event management application 116) may provide a user-facing interface (e.g., user-facing interface 300) that may display one or more problems (one or more problems 304(1), 304(2), 304(3), and 304(N)), via descriptive information on what the event is and one or more response tools for responding to the event.

Operation 620 may be followed by operation 622, which represents identifying a location at which the event occurred. For example, the analytical engine may identify a location at which the event occurred based at least in part on the normalized data.

Operation 622 may be followed by operation 624, which represents displaying additional descriptive information identifying the location at which the event occurred. For example, the event management application may display additional descriptive information identifying the location at which the event occurred.

Operation 624 may be followed by operation 626, which represents issuing, from a remote location, one or more commands in response to the event. For example, the event management application may issue one or more commands in response to the event from a remote location.

Figure 7A:
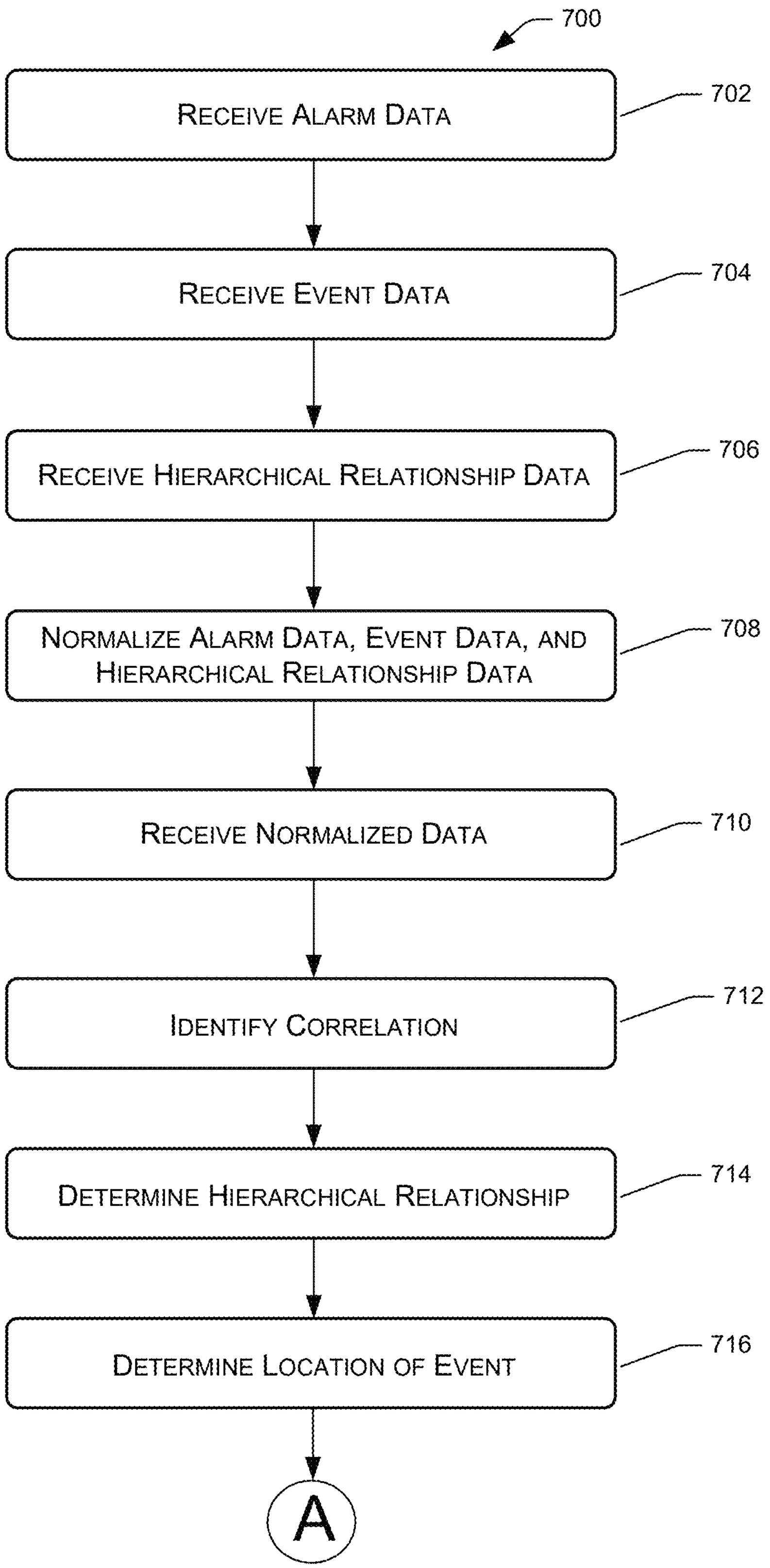
FIGS. 7A and 7B are a flow diagram showing an example method for performing techniques of correlating and localizing distribution network events of a utility system of FIG. 1 according to an example in this disclosure.
Figure 7B:
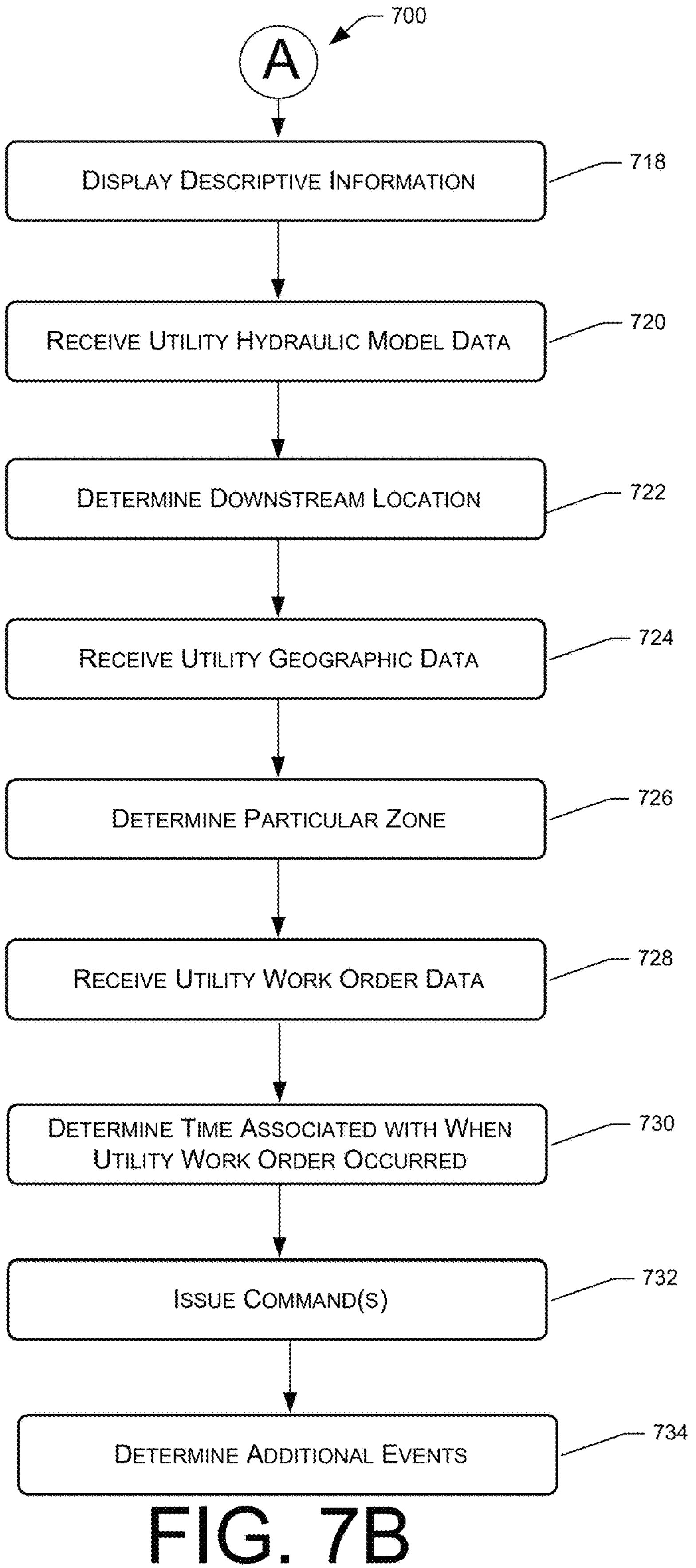

FIGS. 7A and 7B are a flow diagram showing an example method for performing techniques of correlating and localizing distribution network events of a utility system of FIG. 1 according to an example in this disclosure. In one example, data may be analyzed to detect correlations between alarms and/or events detected by or delivered to the utility system that have occurred in the distribution network and resulted in some type of problem and/or impact that has propagated across the distribution network generating alarms and/or detection by more than one sensor.

At operation 702, an integration platform (e.g., integration platform 112) may receive alarm data from a plurality of sensors (e.g., nodes 108(1)-108(N)) in a utility system (e.g., utility system 100).

Operation 702 may be followed by operation 704, which represents receiving event data generated by an analysis of the utility system. For example, the integration platform may receive event data generated by an analysis of the utility system.

Operation 704 may be followed by operation 706, which represents receiving hierarchical relationship data from a device information service associated with the utility system. For example, the integration platform may receive hierarchical relationship data from a device information service associated with the utility system.

Operation 706 may be followed by operation 708, which represents normalizing the alarm data, the event data, and the hierarchical relationship data to obtain normalized data. For example, the integration platform may normalize the alarm data, the event data, and the hierarchical relationship data to obtain normalized data.

Operation 708 may be followed by operation 710, which represents receiving the normalized data in a uniform data format. For example, an analytical engine (e.g., analytical engine 114) may receive the normalized data in a uniform structure/format. The uniform structure/format may be a common event format (CEF) that provides a common format for transferring event data between systems.

Operation 710 may be followed by operation 712, which represents identifying, based at least in part on the normalized data, a correlation between a first alarm detected by a first sensor of the plurality of sensors and a second alarm detected by a second sensor of the plurality of sensors, wherein the first alarm and the second alarm are associated with an event. For example, the analytical engine may identify a correlation between a first alarm detected by a first sensor of the plurality of sensors and a second alarm detected by a second sensor of the plurality of sensors based at least in part on the normalized data.

Operation 712 may be followed by operation 714, which represents determining, based at least in part on the hierarchical relationship data, a hierarchical relationship between the first sensor and the second sensor in the utility system. For example, the analytical engine may determine a hierarchical relationship between the first sensor and the second sensor in the utility system based at least in part on the hierarchical relationship data.

Operation 714 may be followed by operation 716, which represents determining a location of the event in the utility system based at least in part on: the correlation; first time series data associated with the first sensor; second time series data associated with the second sensor; and the hierarchical relationship. For example, the analytical engine may determine a location of the event in the utility system based at least in part on: the correlation; first time series data associated with the first sensor; second time series data associated with the second sensor; and the hierarchical relationship.

Method 700 continues with operation 718 at the upper right portion of FIG. 7B. Operation 718 represents displaying descriptive information identifying the event and one or more response tools for responding to the event. For example, an event management application (e.g., event management application 116) may provide a user-facing interface (e.g., user-facing interface 300) that may display one or more problems (one or more problems 304(1), 304(2), 304(3), and 304(N)), via descriptive information on what the event is and one or more response tools for responding to the event.

Operation 718 may be followed by operation 720, which represents receiving utility hydraulic model data associated with the utility system. For example, the analytical engine may receive utility hydraulic model data associated with the utility system.

Operation 720 may be followed by operation 722, which represents determining, based at least in part on the utility hydraulic model data, an upstream location of a device that is upstream of the first sensor and the second sensor in the utility system. For example, the analytical engine may determine an upstream location of a device that is upstream of the first sensor and the second sensor in the utility system based at least in part on the utility hydraulic model data. In an embodiment according to an example in this disclosure, operation 716, discussed above, may determine the location of the event in the utility system further based at least in part on the upstream location of the device.

Operation 722 may be followed by operation 724, which represents receiving utility geographic data from a geographic information system associated with the utility system. For example, the analytical engine may receive utility geographic data from a geographic information system associated with the utility system.

Operation 724 may be followed by operation 726, which represents determining, based at least in part on the utility geographic data, a particular zone of the utility system in which the first sensor and the second sensor are disposed. For example, the analytical engine may determine a particular zone of the utility system in which the first sensor and the second sensor are disposed based at least in part on the utility geographic data. In an embodiment according to an example in this disclosure, operation 716, discussed above, may determine the location of the event in the utility system further based at least in part on the particular zone.

Operation 726 may be followed by operation 728, which represents receiving utility work order data from a work order management system associated with the utility system. For example, the analytical engine may receive utility work order data from a work order management associated with the utility system.

Operation 728 may be followed by operation 730, which represents determining, based at least in part on the utility work order data, at least one of a time associated with when a utility work order occurred, or a location at which work was performed according to the utility work order. For example, the analytical engine may determine at least one of a time associated with when a utility work order occurred or a location at which work was performed according to the utility work order based at least in part on the utility work order data. In an embodiment according to an example in this disclosure, operation 716, discussed above, may determine the location of the event in the utility system further based at least in part on the time associated with when the utility work order occurred or the location at which work was performed according to the utility work order.

Operation 730 may be followed by operation 732, which represents issuing, from a remote location, one or more commands in response to the event. For example, the event management application may issue one or more commands in response to the event from a remote location.

Operation 732 may be followed by operation 734, which represents determining one or more additional events and determining, based at least in part on the hierarchical relationship, that the one or more additional events are resultant events that are caused at least in part by the event. For example, the analytical engine may determine one or more additional events and determine, based at least in part on the hierarchical relationship, that the one or more additional events are resultant events that are caused at least in part by the event. The event is the root cause of the other resultant events.

EXAMPLE CLAUSES

While the examples described below are described with respect to one or more particular implementations, it should be understood that, in the context of this document, the content of the example clauses can also be implemented in other forms (e.g., servers, cloud or distributed computing resources, advanced metering infrastructure, smart meters, valves, devices, etc.) and/or other implementations. Additionally, any of examples A-BO may be implemented alone or in combination with any other one or more of the examples A-BO.

A. An example method comprising: receiving time series pressure data from a plurality of sensors in a utility system; normalizing the time series pressure data to obtain normalized data; receiving the normalized data in a uniform data format; identifying, based at least in part on the normalized data, a pressure change in a portion of the utility system; generating, based at least in part on the identifying of the pressure change, a severity score associated with the pressure change; determining that the severity score is greater than or equal to a threshold; based at least in part on the severity score being greater than or equal to the threshold, generating a transient pressure event; and displaying descriptive information identifying the transient pressure event and one or more response tools for responding to the transient pressure event.

B. The example method of A, further comprising: analyzing a shape of a waveform of the transient pressure event; comparing the shape of the waveform of the transient pressure event to shapes of waveforms of historical transient pressure events; and based at least in part on the comparing, classifying the transient pressure event as a particular type of transient pressure event.

C. The example method of B, wherein the particular type comprises at least one of: a sharp pressure drop comprising a drop in pressure of at least about 10 psi within a threshold period of time; a negative pressure; or an oscillation.

D. The example method of any of A-C, further comprising: receiving utility hydraulic model data associated with the utility system; normalizing the time series pressure data and the utility hydraulic model data to obtain the normalized data; and identifying, based at least in part on the normalized data, a location at which the transient pressure event occurred.

E. The example method of any of A-D, further comprising determining, based at least in part on the particular type of transient pressure event and the location of the transient pressure event, a component of the utility system that is a likely cause of the transient pressure event.

F. The example method of any of A-E, wherein determining the component of the utility system that is the likely cause of the transient pressure event comprises: determining that the particular type of transient pressure event comprises the sharp pressure drop; determining that the location at which the transient pressure event occurred is located within a threshold distance of a pump station; and determining, based at least in part on the particular type being the sharp pressure drop and the location being within the threshold distance of the pump station, that the pump station is the likely cause of the transient pressure event.

G. The example method of any of A-F, further comprising displaying additional descriptive information identifying the location at which the transient pressure event occurred.

H. The example method of any of A-G, wherein the identifying of the pressure change in the portion of the utility system is based at least in part on first time series pressure data received from a first sensor of the plurality of sensors and second time series pressure data received from a second sensor of the plurality of sensors, wherein at least a portion of the first time series pressure data is concurrent with at least a portion of the second time series pressure data.

I. The example method of any of A-H, wherein the generating of the severity score is based at least in part on a magnitude of the pressure change and a period of time over which the pressure change occurred.

J. The example method of any of A-I, further comprising issuing, from a remote location, one or more commands in response to the transient pressure event.

K. An example non-transitory computer-readable storage media storing computer-executable instructions that, when executed on one or more processors, cause the one or more processors to perform acts comprising: receiving time series pressure data from a plurality of sensors in a utility system; identifying, based at least in part on the time series pressure data, a pressure change in a portion of the utility system; generating, based at least in part on the identifying of the pressure change, a severity score associated with the pressure change; determining that the severity score is greater than or equal to a threshold; based at least in part on the severity score being greater than or equal to the threshold, generating a transient pressure event; and displaying descriptive information identifying the transient pressure event and one or more response tools for responding to the transient pressure event.

L. The example non-transitory computer-readable storage media of K, the acts further comprising: analyzing a shape of a waveform of the transient pressure event; comparing the shape of the waveform of the transient pressure event to shapes of waveforms of historical transient pressure events; and based at least in part on the comparing, classifying the transient pressure event as a particular type of transient pressure event.

M. The example non-transitory computer-readable storage media of L, wherein the particular type comprises at least one of: a sharp pressure drop comprising a drop in pressure of at least about 10 psi within a threshold period of time; a negative pressure; or an oscillation.

N. The example non-transitory computer-readable storage media of any of K-M, the acts further comprising: receiving utility hydraulic model data associated with the utility system; normalizing the time series pressure data and the utility hydraulic model data to obtain normalized data; and identifying, based at least in part on the normalized data, a location at which the transient pressure event occurred.

O. The example non-transitory computer-readable storage media of any of K-N, the acts further comprising: determining, based at least in part on the particular type of transient pressure event and the location of the transient pressure event, a component of the utility system that is a likely cause of the transient pressure event.

P. The example non-transitory computer-readable storage media of any of K-O, wherein determining the component of the utility system is the likely cause of the transient pressure event comprises causing the one or more processors to perform additional acts comprising: determining that the particular type of transient pressure event comprises the sharp pressure drop; determining that the location at which the transient pressure event occurred is located within a threshold distance of a pump station; and determining, based at least in part on the particular type being the sharp pressure drop and the location being within the threshold distance of the pump station, that the pump station is the likely cause of the transient pressure event.

Q. The example non-transitory computer-readable storage media of any of K-P, wherein the identifying of the pressure change in the portion of the utility system is based at least in part on first time series pressure data received from a first sensor of the plurality of sensors and second time series pressure data received from a second sensor of the plurality of sensors, wherein at least a portion of the first time series pressure data is concurrent with at least a portion of the second time series pressure data.

R. An example system comprising: one or more processors; and non-transitory computer readable media storing instructions, that when executed by the one or more processors, cause the system to perform operations comprising: receiving time series pressure data from a plurality of sensors in a utility system; identifying, based at least in part on the time series pressure data, a pressure change in a portion of the utility system; generating, based at least in part on the identifying of the pressure change, a severity score associated with the pressure change; determining that the severity score is greater than or equal to a threshold; based at least in part on the severity score being greater than or equal to the threshold, generating a transient pressure event; and displaying descriptive information identifying the transient pressure event and one or more response tools for responding to the transient pressure event.

S. The example system of R, the operations comprising: analyzing a shape of a waveform of the transient pressure event; comparing the shape of the waveform of the transient pressure event to shapes of waveforms of historical transient pressure events; and based at least in part on the comparing, classifying the transient pressure event as a particular type of transient pressure event.

T. The example system of any of R-S, wherein the particular type comprises at least one of: a sharp pressure drop comprising a drop in pressure of at least about 10 psi within a threshold period of time; a negative pressure; or an oscillation.

U. The example system of any of R-T, the operations further comprising: receiving utility hydraulic model data associated with the utility system; normalizing the time series pressure data and the utility hydraulic model data to obtain normalized data; and identifying, based at least in part on the normalized data, a location at which the transient pressure event occurred.

V. The example system of any of R-U, the operations further comprising: determining, based at least in part on the particular type of transient pressure event and the location of the transient pressure event, a component of the utility system that is a likely cause of the transient pressure event.

W. The example system of any of R-V, wherein determining the component of the utility system that is the likely cause of the transient pressure event comprises the non-transitory computer readable media storing instructions, that when executed by the one or more processors, cause the system to perform additional operations comprising: determining that the particular type of transient pressure event comprises the sharp pressure drop; determining that the location at which the transient pressure event occurred is located within a threshold distance of a pump station; and determining, based at least in part on the particular type being the sharp pressure drop and the location being within the threshold distance of the pump station, that the pump station is the likely cause of the transient pressure event.

X. The example system of any of R-W, wherein the identifying of the pressure change in the portion of the utility system is based at least in part on first time series pressure data received from a first sensor of the plurality of sensors and second time series pressure data received from a second sensor of the plurality of sensors, wherein at least a portion of the first time series pressure data is concurrent with at least a portion of the second time series pressure data.

Y. An example method comprising: receiving time series data from a plurality of sensors in a utility system; receiving utility hydraulic model data associated with the utility system; normalizing the time series data and the utility hydraulic model data to obtain normalized data; receiving the normalized data in a uniform data format; identifying, based at least in part on the normalized data, a correlation between first time series data associated with a first sensor of the plurality of sensors and second time series data associated with a second sensor of the plurality of sensors; determining, based at least in part on the utility hydraulic model data, that the first sensor and the second sensor are disposed downstream of a regulator for controlling a pressure of a product of the utility system; determining, based at least in part on the first time series data and the second time series data and historical data associated with regulator failures, a likelihood of a failure of the regulator; determining that the likelihood is greater than or equal to a threshold; and based at least in part on the likelihood being greater than or equal to the threshold, generating an event; and displaying descriptive information identifying the event and one or more response tools for responding to the event.

Z. The example method of Y, further comprising identifying a location at which the event occurred.

AA. The example method of any of Y-Z, further comprising displaying additional descriptive information identifying the location at which the event occurred.

AB. The example method of any of Y-AA, further comprising issuing, from a remote location, one or more commands in response to the event.

AC. The example method of any of Y-AB, wherein the determining the likelihood of the failure of the regulator is further based on at least one of: soil analysis data; current temperature data; current precipitation data; specification data associated with the regulator; or an age of the regulator.

AD. The example method of any of Y-AC, wherein the first time series data and the second time series data exhibit changes in pressure over time that are associated with the failure of the regulator.

AE. An example non-transitory computer-readable storage media storing computer-executable instructions that, when executed on one or more processors, cause the one or more processors to perform acts comprising: receiving time series data from a plurality of sensors in a system; receiving hydraulic model data associated with the system; identifying, based at least in part on the time series data and the hydraulic model data, a correlation between first time series data associated with a first sensor of the plurality of sensors and second time series data associated with a second sensor of the plurality of sensors; determining, based at least in part on the hydraulic model data, that the first sensor and the second sensor are disposed downstream of a device for controlling a pressure of a product of the system; determining, based at least in part on the first time series data and the second time series data and historical data associated with device failures, a likelihood of a failure of the device; determining that the likelihood is greater than or equal to a threshold; and based at least in part on the likelihood being greater than or equal to the threshold, generating an event; and displaying descriptive information identifying the event and one or more response tools for responding to the event.

AF. The example non-transitory computer-readable storage media of paragraph AE, the acts further comprising: identifying a location at which the event occurred.

AG. The example non-transitory computer-readable storage media of any of AE-AF, the acts further comprising: displaying additional descriptive information identifying the location at which the event occurred.

AH. The example non-transitory computer-readable storage media of any of AE-AG, the acts further comprising: issuing, from a remote location, one or more commands in response to the event.

AI. The example non-transitory computer-readable storage media of any of AE-AH, wherein the determining the likelihood of the failure of the device is further based on at least one of: soil analysis data; current temperature data; current precipitation data; specification data associated with the device; or an age of the device.

AJ. The example non-transitory computer-readable storage media of any of AE-AI, wherein the first time series data and the second time series data exhibit changes in pressure over time that are associated with the failure of the device.

AK. The example non-transitory computer-readable storage media of any of AE-AJ, the acts further comprising: normalizing the time series data and the hydraulic model data to obtain normalized data; and receiving the normalized data in a uniform data format.

AL. An example system comprising: one or more processors; and non-transitory computer readable media storing instructions, that when executed by the one or more processors, cause the system to perform operations comprising: receiving time series data from a plurality of sensors in a system; receiving hydraulic model data associated with the system; identifying, based at least in part on the time series data and the hydraulic model data, a correlation between first time series data associated with a first sensor of the plurality of sensors and second time series data associated with a second sensor of the plurality of sensors; determining, based at least in part on the hydraulic model data, that the first sensor and the second sensor are disposed downstream of a device for controlling a pressure of a product of the system; determining, based at least in part on the first time series data and the second time series data and historical data associated with device failures, a likelihood of a failure of the device; determining that the likelihood is greater than or equal to a threshold; and based at least in part on the likelihood being greater than or equal to the threshold, generating an event; and displaying descriptive information identifying the event and one or more response tools for responding to the event.

AM. The example system of AL, the operations further comprising: identifying a location at which the event occurred.

AN. The example system of any of AL-AM, the operations further comprising: displaying additional descriptive information identifying the location at which the event occurred.

AO. The example system of any of AL-AN, the operations further comprising: issuing, from a remote location, one or more commands in response to the event.

AP. The example system of any of AL-AO, wherein the determining the likelihood of the failure of the device is further based on at least one of: soil analysis data; current temperature data; current precipitation data; specification data associated with the device; or an age of the device.

AQ. The example system of any of AL-AP, wherein the first time series data and the second time series data exhibit changes in pressure over time that are associated with the failure of the device.

AR. The example system of any of AL-AQ, the operations further comprising: normalizing the time series data and the hydraulic model data to obtain normalized data; and receiving the normalized data in a uniform data format.

AS. An example method comprising: receiving alarm data from a plurality of sensors in a utility system; receiving event data generated by an analysis of the utility system; receiving hierarchical relationship data from a device information service associated with the utility system; normalizing the alarm data, the event data, and the hierarchical relationship data to obtain normalized data; receiving the normalized data in a uniform data format; identifying, based at least in part on the normalized data, a correlation between a first alarm detected by a first sensor of the plurality of sensors and a second alarm detected by a second sensor of the plurality of sensors, wherein the first alarm and the second alarm are associated with an event; determining, based at least in part on the hierarchical relationship data, a hierarchical relationship between the first sensor and the second sensor in the utility system; determining a location of the event in the utility system based at least in part on: the correlation; first time series data associated with the first sensor; second time series data associated with the second sensor; and the hierarchical relationship; and displaying descriptive information identifying the location of the event and one or more response tools for responding to the event.

AT. The example method of AS, further comprising: receiving utility hydraulic model data associated with the utility system; determining, based at least in part on the utility hydraulic model data, an upstream location of a device that is upstream of the first sensor and the second sensor in the utility system; and wherein determining the location of the event in the utility system is further based at least in part on the upstream location of the device.

AU. The example method of any of AS-AT, further comprising: receiving utility geographic data from a geographic information system associated with the utility system; determining, based at least in part on the utility geographic data, a particular zone of the utility system in which the first sensor and the second sensor are disposed; and wherein determining the location of the event in the utility system is further based at least in part on the particular zone.

AV. The example method of any of AS-AU, further comprising: receiving utility work order data from a work order management system associated with the utility system; determining, based at least in part on the utility work order data, at least one of a time associated with when a utility work order occurred, or a location at which work was performed according to the utility work order; and wherein determining the location of the event in the utility system is further based at least in part on the at least one of the time when the utility work order occurred or a location at which work was performed according to the utility work order.

AW. The example method of any of AS-AV, further comprising issuing, from a remote location, one or more commands in response to the location of the event.

AX. The example method of any of AS-AW, wherein the first time series data and the second time series data exhibit changes in pressure over time that are associated with a failure of a device for controlling a pressure of a product of the utility system.

AY. The example method of any of AS-AX, further comprising: determining one or more additional events; and determining, based at least in part on the hierarchical relationship, that the one or more additional events are resultant events that are caused at least in part by the event.

AZ. An example non-transitory computer-readable storage media storing computer-executable instructions that, when executed on one or more processors, cause the one or more processors to perform acts comprising: receiving alarm data from a plurality of sensors in a system; receiving event data generated by an analysis of the system; receiving hierarchical relationship data from a device information service associated with the system; identifying, based at least in part on the alarm data, the event data, and the hierarchical relationship data, a correlation between a first alarm detected by a first sensor of the plurality of sensors and a second alarm detected by a second sensor of the plurality of sensors, wherein the first alarm and the second alarm are associated with an event; determining, based at least in part on the hierarchical relationship data, a hierarchical relationship between the first sensor and the second sensor in the system; determining a location of the event in the system based at least in part on: the correlation; first time series data associated with the first sensor; second time series data associated with the second sensor; and the hierarchical relationship; and displaying descriptive information identifying the location of the event and one or more response tools for responding to the event.

BA. The example non-transitory computer-readable storage media of AZ, the acts further comprising: receiving utility hydraulic model data associated with the system; determining, based at least in part on the utility hydraulic model data, an upstream location of a device that is upstream of the first sensor and the second sensor in the system; and wherein determining the location of the event in the system is further based at least in part on the upstream location of the device.

BB. The example non-transitory computer-readable storage media of any of AZ-BA, the acts further comprising: receiving utility geographic data from a geographic information system associated with the system; determining, based at least in part on the utility geographic data, a particular zone of the system in which the first sensor and the second sensor are disposed; and wherein determining the location of the event in the system is further based at least in part on the particular zone.

BC. The example non-transitory computer-readable storage media of any of AZ-BB, the acts further comprising: receiving work order data from a work order management system associated with the system; determining, based at least in part on the work order data, at least one of a time associated with when a work order occurred, or a location at which work was performed according to the work order; and wherein determining the location of the event in the system is further based at least in part on the at least one of the time when the work order occurred or a location at which work was performed according to the work order.

BD. The example non-transitory computer-readable storage media of any of AZ-BC, the acts further comprising issuing, from a remote location, one or more commands in response to the location of the event.

BE. The example non-transitory computer-readable storage media of any of AZ-BD, wherein the first time series data and the second time series data exhibit changes in pressure over time that are associated with a failure of a device for controlling a pressure of a product of the system.

BF. The example non-transitory computer-readable storage media of any of AZ-BE, the acts further comprising: normalizing the alarm data, the event data, and the hierarchical relationship data to obtain normalized data; and receiving the normalized data in a uniform data format.

BG. The example non-transitory computer-readable storage media of any of AZ-BF, the acts further comprising: determining one or more additional events; and determining, based at least in part on the hierarchical relationship, that the one or more additional events are resultant events that are caused at least in part by the event.

BH. An example system comprising: one or more processors; and non-transitory computer readable media storing instructions, that when executed by the one or more processors, cause the system to perform operations comprising: receiving alarm data from a plurality of sensors in a system; receiving event data generated by an analysis of the system;

receiving hierarchical relationship data from a device information service associated with the system; identifying, based at least in part on the alarm data, the event data, and the hierarchical relationship data, a correlation between a first alarm detected by a first sensor of the plurality of sensors and a second alarm detected by a second sensor of the plurality of sensors, wherein the first alarm and the second alarm are associated with an event; determining, based at least in part on the hierarchical relationship data, a hierarchical relationship between the first sensor and the second sensor in the system; determining a location of the event in the system based at least in part on: the correlation; first time series data associated with the first sensor; second time series data associated with the second sensor; and the hierarchical relationship; and displaying descriptive information identifying the location of the event and one or more response tools for responding to the event.

BI. The example system of BH, the operations further comprising: receiving utility hydraulic model data associated with the system; determining, based at least in part on the utility hydraulic model data, an upstream location of a device that is upstream of the first sensor and the second sensor in the system; and wherein determining the location of the event in the system is further based at least in part on the upstream location of the device.

BJ. The example system of any of BH-BI, the operations further comprising: receiving utility geographic data from a geographic information system associated with the system; determining, based at least in part on the utility geographic data, a particular zone of the system in which the first sensor and the second sensor are disposed; and wherein determining the location of the event in the system is further based at least in part on the particular zone.

BK. The example system of any of BH-BJ, the operations further comprising: receiving work order data from a work order management system associated with the system; determining, based at least in part on the work order data, at least one of a time associated with when a work order occurred, or a location at which work was performed according to the work order; and wherein determining the location of the event in the system is further based at least in part on the at least one of the time when the work order occurred or a location at which work was performed according to the work order.

BL. The example system of any of BH-BK, the operations further comprising issuing, from a remote location, one or more commands in response to the location of the event.

BM. The example system of any of BH-BL, wherein the first time series data and the second time series data exhibit changes in pressure over time that are associated with a failure of a device for controlling a pressure of a product of the system.

BN. The example system of any of BH-BM, the operations further comprising: normalizing the alarm data, the event data, and the hierarchical relationship data to obtain normalized data; and receiving the normalized data in a uniform data format.

BO. The example system of any of BH-BN, the operations further comprising: determining one or more additional events; and determining, based at least in part on the hierarchical relationship, that the one or more additional events are resultant events that are caused at least in part by the event.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:

receiving alarm data from a plurality of sensors in a utility system;

receiving event data generated by an analysis of the utility system;

receiving utility geographic data from a geographic information system associated with the utility system;

receiving hierarchical relationship data from a device information service associated with the utility system;

normalizing the alarm data, the utility geographic data, the event data, and the hierarchical relationship data to obtain normalized data;

receiving the normalized data in a uniform data format;

identifying, based at least in part on the normalized data, a correlation between a first alarm detected by a first sensor of the plurality of sensors and a second alarm detected by a second sensor of the plurality of sensors, wherein the first alarm and the second alarm are associated with an event;

determining, based at least in part on the utility geographic data, a particular zone of the utility system in which the first sensor and the second sensor are disposed;

determining, based at least in part on the hierarchical relationship data, a hierarchical relationship between the first sensor and the second sensor in the utility system;

determining a location of the event in the utility system based at least in part on:

the correlation, first time series data associated with the first sensor, second time series data associated with the second sensor, the particular zone, and the hierarchical relationship, and displaying descriptive information identifying the location of the event and one or more response tools for responding to the event.

2. The method of claim 1, further comprising:

receiving utility hydraulic model data associated with the utility system; and determining, based at least in part on the utility hydraulic model data, an upstream location of a device that is upstream of the first sensor and the second sensor in the utility system;

wherein determining the location of the event in the utility system is further based at least in part on the upstream location of the device.

3. The method of claim 1, further comprising:

receiving utility work order data from a work order management system associated with the utility system; and determining, based at least in part on the utility work order data, at least one of a time associated with when a utility work order occurred, or a location at which work was performed according to the utility work order;

wherein determining the location of the event in the utility system is further based at least in part on the at least one of the time when the utility work order occurred or the location at which work was performed according to the utility work order.

4. The method of claim 1, further comprising issuing, from a remote location, one or more commands in response to the location of the event.

5. The method of claim 1, wherein the first time series data and the second time series data exhibit changes in pressure over time that are associated with a failure of a device for controlling a pressure of a product of the utility system.

6. The method of claim 1, further comprising:
determining one or more additional events; and
determining, based at least in part on the hierarchical relationship, that the one or more additional events are resultant events that are caused at least in part by the event.

7. The method of claim 1, wherein at least one of:
the first sensor comprises a first pressure sensor; or
the second sensor comprises a second pressure sensor.

8. A non-transitory computer-readable storage media storing computer-executable instructions that, when executed on one or more processors, cause the one or more processors to perform acts comprising:
receiving alarm data from a plurality of sensors in a system;
receiving event data generated by an analysis of the system;
receiving utility geographic data from a geographic information system associated with the system;
receiving hierarchical relationship data from a device information service associated with the system;
identifying, based at least in part on the alarm data, the event data, the utility geographic data, and the hierarchical relationship data, a correlation between a first alarm detected by a first sensor of the plurality of sensors and a second alarm detected by a second sensor of the plurality of sensors, wherein the first alarm and the second alarm are associated with an event;
determining, based at least in part on the utility geographic data, a particular zone of the system in which the first sensor and the second sensor are disposed;
determining, based at least in part on the hierarchical relationship data, a hierarchical relationship between the first sensor and the second sensor in the system;
determining a location of the event in the system based at least in part on:
the correlation,
first time series data associated with the first sensor,
second time series data associated with the second sensor,
the particular zone, and
the hierarchical relationship, and
displaying descriptive information identifying the location of the event and one or more response tools for responding to the event.

9. The non-transitory computer-readable storage media of claim 8, wherein the acts further comprise:
receiving utility hydraulic model data associated with the system; and
determining, based at least in part on the utility hydraulic model data, an upstream location of a device that is upstream of the first sensor and the second sensor in the system;
wherein determining the location of the event in the system is further based at least in part on the upstream location of the device.

10. The non-transitory computer-readable storage media of claim 8, wherein the acts further comprise:
receiving work order data from a work order management system associated with the system; and
determining, based at least in part on the work order data, at least one of a time associated with when a work order occurred, or a location at which work was performed according to the work order;
wherein determining the location of the event in the system is further based at least in part on the at least one of the time when the work order occurred or the location at which work was performed according to the work order.

11. The non-transitory computer-readable storage media of claim 8, wherein the acts further comprise issuing, from a remote location, one or more commands in response to the location of the event.

12. The non-transitory computer-readable storage media of claim 8, wherein the first time series data and the second time series data exhibit changes in pressure over time that are associated with a failure of a device for controlling a pressure of a product of the system.

13. The non-transitory computer-readable storage media of claim 8, wherein the acts further comprise:
normalizing the alarm data, the event data, and the hierarchical relationship data to obtain normalized data; and
receiving the normalized data in a uniform data format.

14. The non-transitory computer-readable storage media of claim 8, wherein the acts further comprise:
determining one or more additional events; and
determining, based at least in part on the hierarchical relationship, that the one or more additional events are resultant events that are caused at least in part by the event.

15. The non-transitory computer-readable storage media of claim 8, wherein at least one of:
the first sensor comprises a first pressure sensor; or
the second sensor comprises a second pressure sensor.

16. A system comprising:
one or more processors; and
non-transitory computer readable media storing instructions, that when executed by the one or more processors, cause the system to perform operations comprising:
receiving alarm data from a plurality of sensors in the system;
receiving event data generated by an analysis of the system;
receiving utility geographic data from a geographic information system associated with the system;
receiving hierarchical relationship data from a device information service associated with the system;
identifying, based at least in part on the alarm data, the event data, the utility geographic data, and the hierarchical relationship data, a correlation between a first alarm detected by a first sensor of the plurality of sensors and a second alarm detected by a second sensor of the plurality of sensors, wherein the first alarm and the second alarm are associated with an event;
determining, based at least in part on the utility geographic data, a particular zone of the system in which the first sensor and the second sensor are disposed;
determining, based at least in part on the hierarchical relationship data, a hierarchical relationship between the first sensor and the second sensor in the system;

determining a location of the event in the system based at least in part on:

the correlation, first time series data associated with the first sensor, second time series data associated with the second sensor, the particular zone and the hierarchical relationship, and displaying descriptive information identifying the location of the event and one or more response tools for responding to the event.

17. The system of claim 16, wherein the operations further comprise:

receiving utility hydraulic model data associated with the system; and determining, based at least in part on the utility hydraulic model data, an upstream location of a device that is upstream of the first sensor and the second sensor in the system;

wherein determining the location of the event in the system is further based at least in part on the upstream location of the device.

18. The system of claim 16, wherein the operations further comprise:

receiving work order data from a work order management system associated with the system; and determining, based at least in part on the work order data, at least one of a time associated with when a work order occurred, or a location at which work was performed according to the work order;

wherein determining the location of the event in the system is further based at least in part on the at least one of the time when the work order occurred or the location at which work was performed according to the work order.

19. The system of claim 16, wherein the operations further comprise issuing, from a remote location, one or more commands in response to the location of the event.

20. The system of claim 16, wherein the first time series data and the second time series data exhibit changes in pressure over time that are associated with a failure of a device for controlling a pressure of a product of the system.

21. The system of claim 16, wherein the operations further comprise:

normalizing the alarm data, the event data, and the hierarchical relationship data to obtain normalized data; and receiving the normalized data in a uniform data format.

22. The system of claim 16, wherein the operations further comprise:

determining one or more additional events; and determining, based at least in part on the hierarchical relationship, that the one or more additional events are resultant events that are caused at least in part by the event.

23. The system of claim 16, wherein at least one of:

the first sensor comprises a first pressure sensor; or the second sensor comprises a second pressure sensor.

* * * * *